United States Patent
Khoshnevisan et al.

(10) Patent No.: US 12,407,449 B2
(45) Date of Patent: Sep. 2, 2025

(54) CONTROL CHANNEL REPETITION FOR HIGHER BANDS

(71) Applicant: QUALCOMM Incorporated, San Diego, CA (US)

(72) Inventors: Mostafa Khoshnevisan, San Diego, CA (US); Jing Sun, San Diego, CA (US); Wooseok Nam, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/175,483

(22) Filed: Feb. 27, 2023

(65) Prior Publication Data

US 2023/0318747 A1 Oct. 5, 2023

Related U.S. Application Data

(60) Provisional application No. 63/326,047, filed on Mar. 31, 2022.

(51) Int. Cl.
*H04L 1/16* (2023.01)
*H04L 1/1607* (2023.01)
*H04W 8/22* (2009.01)
*H04W 72/0446* (2023.01)

(52) U.S. Cl.
CPC .............. *H04L 1/1614* (2013.01); *H04W 8/22* (2013.01); *H04W 72/0446* (2013.01)

(58) Field of Classification Search
CPC ... H04L 1/1614; H04L 5/0053; H04L 5/0094; H04W 8/22; H04W 72/0446
See application file for complete search history.

(56) References Cited

U.S. PATENT DOCUMENTS

| | | | |
|---|---|---|---|
| 2024/0129933 A1* | 4/2024 | Matsumura | H04L 5/0094 |
| 2024/0357603 A1* | 10/2024 | Muruganathan | H04L 5/0091 |
| 2025/0141529 A1* | 5/2025 | Matsumura | H04W 16/28 |

OTHER PUBLICATIONS

International Search Report and Written Opinion—PCT/US2023/014172—ISA/EPO—Jun. 7, 2023.

(Continued)

*Primary Examiner* — Hashim S Bhatti
(74) *Attorney, Agent, or Firm* — Holland & Hart LLP

(57) ABSTRACT

Methods, systems, and devices for wireless communications are described. A user equipment (UE) may support monitoring for intra-slot and intra-slot-group control channel repetitions. The UE may receive a message indicating a respective set of parameters for a first search space set and a second search space set, an indication that the first and second search space sets are linked, and a respective bitmap for each of the search space sets, where the bitmaps include a same quantity of bits. The bitmaps may indicate a quantity of slots and a location of the slots within a group of slots in which a respective search space set exists within the group of slots. As such, the UE may monitor the first and second search space sets based on the respective sets of parameters and the respective bitmaps (e.g., using monitoring occasions associated with each search space set linked based on the bitmaps).

30 Claims, 15 Drawing Sheets

(56) References Cited

OTHER PUBLICATIONS

Moderator (Lenovo): "Feature Lead Summary #4 for B52.6 GHz PDCCH Monitoring Enhancements", 3GPP TSG RAN WG1#108, R1-2202713, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, XP052119584, Mar. 2, 2022, 269 pages, p. 55-p. 116.
Moderator (Qualcomm): "Summary #2 of [108-e-R17-MIM0-02] Email Discussion for Maintenance on Multi-TRP for PDCCH", 3GPP TSG-RAN WG1 Meeting #108-e, R1-2202596, 3rd Generation Partnership Project, Mobile Competence Centre, 650, Route Des Lucioles, F-06921 Sophia-Antipolis Cedex, France, vol. RAN WG1, No. e-Meeting, Feb. 21, 2022-Mar. 3, 2022, XP052119556, Mar. 2, 2022, 32 pages, p. 11-p. 17.
Qualcomm Incorporated: "Enhancements on Multi-TRP for PDCCH, PUCCH and PUSCH", 3GPP TSG-RAN WG1 Meeting #104-e, R1-2101447, 3rd Generation Partnership Project, Mobile Competence Centre, 650, Route Des Lucioles, F-06921 Sophia-Antipolis Cedex, France, vol. RAN WG1, No. e-Meeting, Jan. 25, 2021-Feb. 5, 2021, Jan. 19, 2021, pp. 1-28, XP051971612, para [02.1], figure 3 proposal 12 and preceding para, p. 9.

\* cited by examiner

CONTROL CHANNEL REPETITION FOR HIGHER BANDS

CROSS REFERENCE

The present application for patent claims the benefit of U.S. Provisional Patent Application No. 63/326,047 by KHOSHNEVISAN et al., entitled "CONTROL CHANNEL REPETITION FOR HIGHER BANDS," filed Mar. 31, 2022, assigned to the assignee hereof, and expressly incorporated by reference herein.

FIELD OF TECHNOLOGY

The following relates to wireless communications, including control channel repetition for higher bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Some wireless communications systems may support communications between a network entity and a UE. The UE may be configured with one or more search space sets in which the UE may monitor control channel occasions. In some cases, however, UEs operating in a relatively high frequency range may incur increased resource and power consumption if the UEs monitor the one or more search space sets on a per-slot basis.

SUMMARY

The described techniques relate to improved methods, systems, devices, and apparatuses that support control channel repetition for higher bands. For example, the described techniques provide for two search space sets to be linked for control channel repetition monitoring when a user equipment (UE) is operating in higher bands. In some examples, the UE may use a monitoring parameter (e.g., monitoringSlotWithinSlotGroup) when intra-slot control channel repetition or intra-slot-group control channel repetition is enabled. The UE may receive a first message indicating a first set of parameters for a first search space set and a second set of parameters for a second search space set, and indicating that the first and second search space sets are linked (e.g., via a linking parameter). Each set of parameters may include at least one of a periodicity and offset parameter, a duration parameter, a monitoring parameter, or other parameters. In addition, the first message may indicate a first bitmap for the first search space set and a second bitmap for the second search space set, where the first and second bitmaps may include a same quantity of bits. In addition, the first bitmap and the second bitmap may indicate a quantity of slots and a location of the slots within a slot group in which a respective search space set exists within the slot group for control channel monitoring (e.g., via a monitoring parameter corresponding to each search space set). As such, the UE may monitor each search space set based on the respective set of parameters and in accordance with the respective bitmap, which may enable the UE to monitor two linked search space sets for intra-slot or intra-slot-group control channel repetition.

A method for wireless communication at a UE is described. The method may include receiving a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits, monitoring the first search space set based on the first set of parameters and in accordance with the first bitmap, and monitoring the second search space set based on the second set of parameters and in accordance with the second bitmap.

An apparatus for wireless communication at a UE is described. The apparatus may include a processor, and a memory coupled with the processor, wherein the memory comprises instructions executable by the processor to cause the apparatus to receive a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits, monitor the first search space set based on the first set of parameters and in accordance with the first bitmap, and monitor the second search space set based on the second set of parameters and in accordance with the second bitmap.

Another apparatus for wireless communication at a UE is described. The apparatus may include means for receiving a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits, means for monitoring the first search space set based on the first set of parameters and in accordance with the first bitmap, and means for monitoring the second search space set based on the second set of parameters and in accordance with the second bitmap.

A non-transitory computer-readable medium storing code for wireless communication at a UE is described. The code may include instructions executable by a processor to receive a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits, monitor the first search space set based on the first set of parameters and in accordance with the first bitmap, and monitor the second search space set based on the second set of parameters and in accordance with the second bitmap.

In some examples of the method, apparatuses, and non-transitory computer-readable medium described herein, receiving the first message may include operations, features, means, or instructions for receiving the first message indicating that a linking parameter may be configured with a first value corresponding to the first search space set and a second value corresponding to the second search space set, where the indication that the first search space set and the second search space set may be linked may be based on the linking parameter.

In some examples of the method, apparatuses, and non-transitory computer-readable medium described herein, receiving the first message may include operations, features, means, or instructions for receiving the first message indicating that a monitoring parameter may be configured for each of the first search space set and the second search space set, where the indication of the quantity of slots and the location of the slots within the group of slots may be based on the monitoring parameter.

Some examples of the method, apparatuses, and non-transitory computer-readable medium described herein may further include operations, features, means, or instructions for identifying that a value of each bit in the first bitmap may be the same as a value of each bit in the second bitmap based on the monitoring parameter being the same for the first search space set and the second search space set.

Some examples of the method, apparatuses, and non-transitory computer-readable medium described herein may further include operations, features, means, or instructions for linking each monitoring occasion of a set of multiple monitoring occasions of the first search space set with each monitoring occasion of a set of multiple monitoring occasions of the second search space set in a first slot in which the first search space set and the second search space set may be monitored.

Some examples of the method, apparatuses, and non-transitory computer-readable medium described herein may further include operations, features, means, or instructions for identifying that the first bitmap and the second bitmap include a same quantity of first values and second values based on the monitoring parameter indicating the same quantity of first values and second values for the first search space set and the second search space set, where the first values and second values may be in a same location or a different location of the first bitmap and the second bitmap.

Some examples of the method, apparatuses, and non-transitory computer-readable medium described herein may further include operations, features, means, or instructions for monitoring the first search space set and the second search space set in the same quantity of slots based on identifying that the first bitmap and the second bitmap include a same quantity of first values and second values.

Some examples of the method, apparatuses, and non-transitory computer-readable medium described herein may further include operations, features, means, or instructions for linking a first instance within a first group of slots of the first search space set with a first instance within a second group of slots of the second search space set, where the first instance within the first group of slots corresponds to a first instance of a first value in the first bitmap and the first instance within the second group of slots corresponds to a first instance of the first value in the second bitmap.

Some examples of the method, apparatuses, and non-transitory computer-readable medium described herein may further include operations, features, means, or instructions for linking a first instance of a monitoring occasion of the first instance within the first group of slots of the first search space set with a first instance of a monitoring occasion of the first instance within the second group of slots of the second search space set.

Some examples of the method, apparatuses, and non-transitory computer-readable medium described herein may further include operations, features, means, or instructions for linking each monitoring occasion of a set of multiple monitoring occasions of the first search space set with each monitoring occasion of a set of multiple monitoring occasions of the second search space set in a first group of slots in which the first search space set and the second search space set may be monitored.

In some examples of the method, apparatuses, and non-transitory computer-readable medium described herein, receiving the first message may include operations, features, means, or instructions for receiving the first message indicating one or more starting symbols of one or more monitoring occasions within a slot that corresponds to a third bitmap for the first search space set and a fourth bitmap for the second search space set and identifying that a first product between a quantity of first values in the first bitmap of the first search space set and a quantity of first values in the third bitmap for the first search space set may be equal to a second product between a quantity of first values in the second bitmap of the second search space set and a quantity of first values in the fourth bitmap for the second search space set.

Some examples of the method, apparatuses, and non-transitory computer-readable medium described herein may further include operations, features, means, or instructions for linking a first instance of a monitoring occasion within a first group of slots of the first search space set with a first instance of a monitoring occasion within a second group of slots of the second search space set.

In some examples of the method, apparatuses, and non-transitory computer-readable medium described herein, a periodicity, a slot offset, and a duration may be the same for the first search space set and the second search space set based on a first product between a quantity of first values in the first bitmap of the first search space set and a quantity of first values in the third bitmap for the first search space set being equal to a second product between a quantity of first values in the second bitmap of the second search space set and a quantity of first values in the fourth bitmap for the second search space set.

In some examples of the method, apparatuses, and non-transitory computer-readable medium described herein, receiving the first message may include operations, features, means, or instructions for receiving the first message indicating one or more starting symbols of one or more monitoring occasions within a slot that corresponds to a third bitmap for each of the first search space set and the second search space set and identifying that a first product between a quantity of first values in the first bitmap of the first search space set and a quantity of first values in the third bitmap for the first search space set may be equal to a second product between a quantity of first values in the second bitmap of the second search space set and a quantity of first values in the third bitmap for the second search space set.

In some examples of the method, apparatuses, and non-transitory computer-readable medium described herein, a periodicity, a slot offset, a duration, and a quantity of monitoring occasions within a slot may be the same for the first search space set and the second search space set based on the first bitmap and the second bitmap being the same.

In some examples of the method, apparatuses, and non-transitory computer-readable medium described herein, a periodicity, a slot offset, a duration, and a quantity of monitoring occasions within a slot may be the same for the first search space set and the second search space set based on the first bitmap and the second bitmap having a same quantity of first values and second values.

Some examples of the method, apparatuses, and non-transitory computer-readable medium described herein may further include operations, features, means, or instructions for transmitting a second message indicating a capability of the UE to monitor the first search space set and the second search space set in one or more slots, in one or more groups of slots, or a combination thereof.

In some examples of the method, apparatuses, and non-transitory computer-readable medium described herein, transmitting the second message may include operations, features, means, or instructions for transmitting the second message indicating the capability of the UE to link the first search space set and the second search space set each with more than one monitoring slots within a group of slots.

In some examples of the method, apparatuses, and non-transitory computer-readable medium described herein, transmitting the second message may include operations, features, means, or instructions for transmitting the second message indicating the capability of the UE to configure the first search space set linked to the second search space set with different monitoring slots within a group of slots with more than one monitoring occasions within a slot.

Some examples of the method, apparatuses, and non-transitory computer-readable medium described herein may further include operations, features, means, or instructions for monitoring a first control channel candidate in the first search space set and a second control channel candidate in the second search space set to detect a same downlink control information payload.

DETAILED DESCRIPTION

Figure 1:
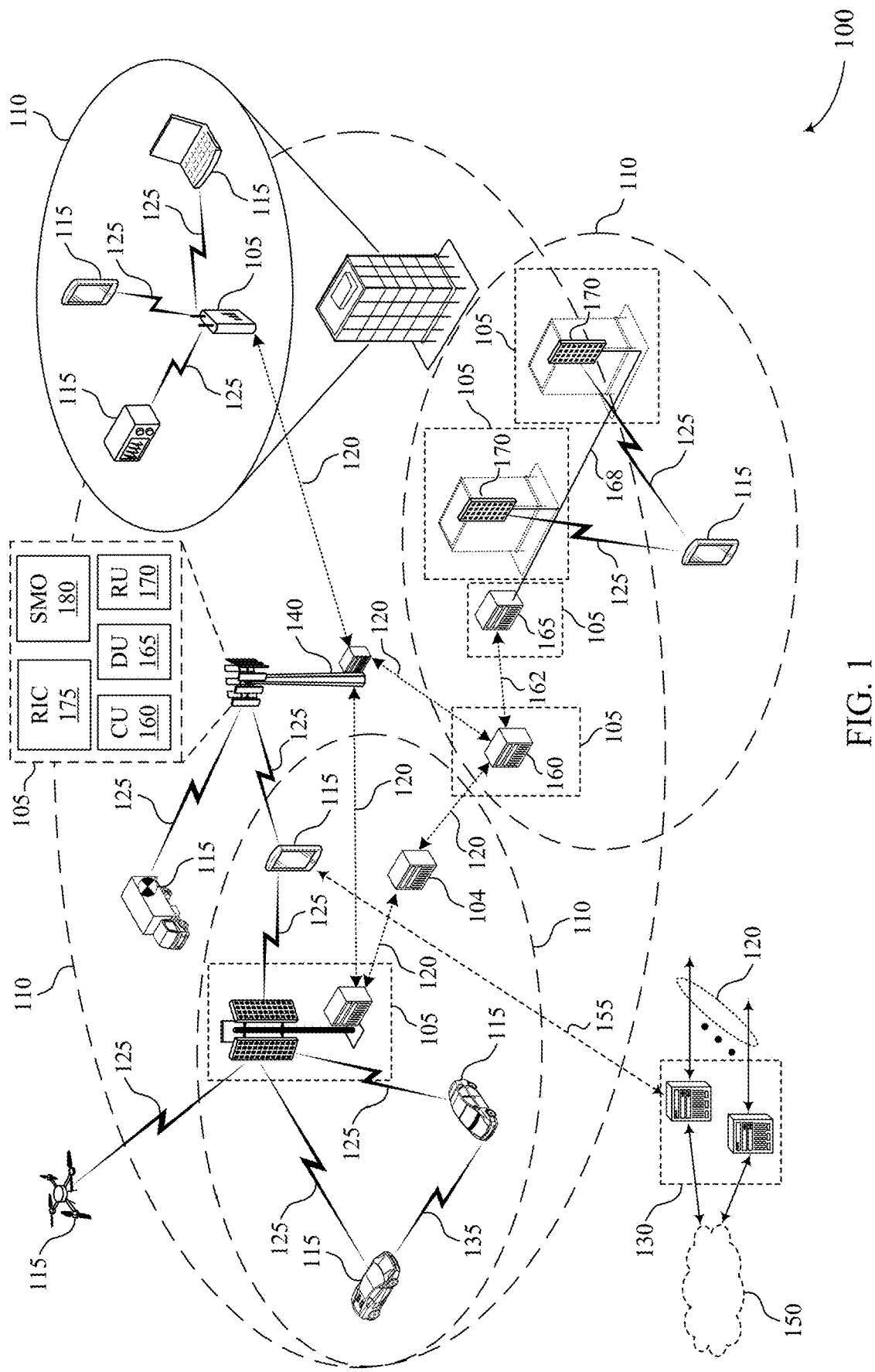
FIG. 1 illustrates an example of a wireless communications system that supports control channel repetition for higher bands in accordance with one or more aspects of the present disclosure.

Some wireless communications may support one or more search space sets configured for a user equipment (UE), in which the UE may monitor control channel (e.g., physical downlink control channel (PDCCH)) occasions. In some examples, two control channel repetitions may be linked together for repetition of a same information payload. As such, two search space sets may be linked via parameter configurations. For example, the linked search space sets may be configured with a same periodicity, slot offset, duration, and quantity of monitoring occasions within a slot. The UE may monitor the linked search space sets using one or more monitoring occasions within a particular slot. Some UEs may operate in a frequency range 2-2 (FR2-2) (e.g., 52.6 GHz to 71 GHz corresponding to a subcarrier spacing of 480 kHz or 960 kHz), which may increase resource and power consumption of a UE monitoring the search space sets on a per-slot basis as the subcarrier spacing frequency associated with FR2-2 may result in relatively short slots. Accordingly, a UE operating in FR2-2 (e.g., or other relatively higher frequency bands) may have a capability for multi-slot control channel monitoring that is based on slots within a slot group. As a result, some search space configurations may be updated to account for the use of multi-slot control channel monitoring.

The techniques described herein enable two search space sets to be linked for control channel repetition monitoring when a UE is operating in higher bands (e.g., FR2-2). For example, the UE may use a monitoring parameter (e.g., monitoringSlotWithinSlotGroup) when two linked monitoring occasions of two linked search space sets are in a same slot (e.g., intra-slot control channel repetition) and when two linked monitoring occasions of two linked search space sets are in different slots of a same slot group (e.g., intra-slot-group control channel repetition), where the monitoring parameter may be used to link the search space sets.

A UE may receive a first message indicating a first set of parameters for a first search space set and a second set of parameters for a second search space set, and indicating that the first and second search space sets are linked (e.g., via a linking parameter). Each set of parameters may include at least one of a periodicity and offset parameter, a duration parameter, a monitoring parameter, or other parameters. In addition, the first message may indicate a first bitmap for the first search space set and a second bitmap for the second search space set, where the first and second bitmaps may include a same quantity of bits. Additionally, or alternatively, the first bitmap and the second bitmap may indicate a quantity of slots and a location of the slots within a slot group in which a respective search space set exists within the slot group for control channel monitoring (e.g., via a monitoring parameter corresponding to each search space set). As such, the UE may monitor each search space set based on the respective set of parameters and in accordance with the respective bitmap, which may enable the UE to monitor two linked search space sets for intra-slot or intra-slot-group control channel repetition, thus reducing resource and power consumption at the UE, among other benefits.

Aspects of the disclosure are initially described in the context of wireless communications systems. Aspects of the disclosure are then described in the context of control channel monitoring configurations and process flows. Aspects of the disclosure are further illustrated by and described with reference to apparatus diagrams, system diagrams, and flowcharts that relate to control channel repetition for higher bands.

FIG. 1 illustrates an example of a wireless communications system 100 that supports control channel repetition for higher bands in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support control channel repetition for higher bands as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

In some examples, a UE 115 may be configured with a quantity of CORESETs and a quantity of search space sets. For example, a UE 115 may be configured with up to five CORESETs in a given BWP, where a CORESET may be associated with parameters such as a transmission configuration indication (TCI) state for PDCCH repetition, a quantity of resource blocks in a frequency domain, a quantity of symbols (e.g., 1, 2, 3 OFDM symbols), a control channel element (CCE)-resource element group (REG) bundle mapping type, a precoding granularity, and a scrambling identifier to use for PDCCH demodulation reference signal (DMRS) and coded bits of downlink control information (DCI), among other examples. In addition, the UE 115 may be configured with up to ten search space sets in a given BWP, where a search space set may be associated with one or more parameters. For example, the parameters may include a CORESET associated with a search space set, a search space set type (e.g., UE-specific or common), one or more DCI formats to monitor, and a quantity of PDCCH candidate for each aggregation level, among other parameters.

In addition, each search space set may be configured with a set of PDCCH monitoring occasions in time, which may be indicated based on a periodicity and offset (e.g., monitoringSlotPeriodicityAndOffset), a time duration (e.g., Duration), and a PDCCH monitoring pattern (e.g., monitoringSymbolsWithinSlot). For example, a periodicity $k_s$ and an offset $o_s$ slots may be indicated in units of slots, and a duration (e.g., $T_s$) may indicate how many slots within a period the search space set exists (where $T_s < k_s$). In addition, the PDCCH monitoring pattern within a slot may indicate one or more first symbols of the CORESET within a slot for PDCCH monitoring using a bitmap of 14 symbols. For example, if the CORESET associated with a particular search space set has three symbols, and the PDCCH monitoring parameter (e.g., monitoringSymbolsWithinSlot) for the search space set indicates a bitmap "01000010001000," there may be three monitoring occasions (e.g., corresponding to the bits with a value of 1 in the bitmap) in each slot that the search space set exists. In some examples, the UE 115 may determine that one or more PDCCH monitoring occasions exist in a slot with a quantity $n_{s,f}^\mu$ in a frame with a quantity $n_f$ if $(n_f \cdot N_{slot}^{frame,\mu} + n_{s,f}^\mu - o_s) \bmod k_s = 0$. The UE 115 may monitor one or more PDCCH candidates for a search space set s for $T_s$ consecutive slots, starting from slot $n_{s,f}^\mu$ and the UE 115 may refrain from monitoring one or more PDCCH candidates for the search space set s for the next $k_s - T_s$ consecutive slots.

In some examples, each PDCCH repetition may correspond to a PDCCH candidate, where two PDCCH candidates may be explicitly linked together for repetition of a same DCI payload. That is, the two PDCCH candidates may have the same aggregation level (e.g., and accordingly, the same quantity of CCEs), and the same DCI payload transmitted using the two PDCCH candidates. In some examples, the UE 115 may perform soft combining to decode the DCI, or the UE 115 may attempt to individually decode the two PDCCH candidates. In addition, the UE 115 may obtain knowledge of the linking before performing the decoding.

To provide the linkage between the two PDCCH candidates in the case of intra-slot repetition, two search space sets may be linked via RRC configurations. For example, the two linked search space sets may be configured with a same periodicity and slot offset (e.g., monitoringSlotPeriodicityAndOffset) and a same duration (e.g., Duration), which may ensure that the two search space sets exist in a same set of slots. In addition, one or more monitoring occasions of the two linked search space sets may be one-to-one mapped within a slot. That is, the two linked search space sets may have a same quantity of monitoring occasions within a slot, where an $n^{th}$ monitoring occasion of one search space set may be linked with an $n^{th}$ monitoring occasion of the other search space set. Additionally, PDCCH candidates with the same aggregation level and a same candidate index in the two linked search space sets and two corresponding monitoring occasions may be linked. Accordingly, the two linked search space sets may be configured with a same quantity of PDCCH candidates for each aggregation level.

In some examples, some UEs 115 may operate in a frequency range 2 (FR2), which may correspond to frequency bands from 24.25 GHz to 52.6 GHz (e.g., FR2-1). In FR2, a control channel subcarrier spacing may be 120 kHz and a data channel subcarrier spacing may be 60 kHz. Some other UEs 115 may operate in FR2-2, which may correspond to higher bands between 52.6 GHz to 71 GHz. In FR2-2, a control channel subcarrier spacing may be 120 kHz and a data channel subcarrier spacing may be 480 kHz or 960 kHz. Because of the higher bands supported by FR2-2, slots may become too short, and subsequently, may increase resource consumption for per-slot monitoring. As such, a UE 115 may have a multi-slot PDCCH monitoring capability for 480 kHz and 960 kHz SCSs, where the multi-slot PDCCH monitoring is based on slots within a slot group. The UE 115 may monitor one or more PDCCHs in a quantity of consecutive slots (e.g., 1, 2, or 4 slots) in a slot group including a quantity of slots (e.g., 4 or 8), which may be indicated by a UE capability.

As a result of the multi-slot PDCCH monitoring, the UE 115 may use a particular search space set configuration. In some examples, a searchSpace information element may include a set of parameters which support the multi-slot PDCCH monitoring. For example, a slot periodicity and offset parameter (e.g., monitoringSlotPeriodicityAndOffset) may indicate a periodicity and offset of PDCCH monitoring occasions of a search space set. The periodicity may be indicated in units of slots (e.g., {4, 8, 16, 20, 32, 40, 64, 80, 128, 160, 320, 640, 1280, 2560, 5120, 10240, 20480} slots) and a configured periodicity may be restricted to be an integer multiple of L slots. The offset may be indicated in units of slots $$\left(\text{e.g.,} \left\{0, 4, 8, \ldots, 4\left[\frac{X_p - 1}{4}\right]\right\} \text{slots,}\right.$$

where $X_p$ may represent the selected periodicity), and where a configured offset may be restricted to be an integer multiple of L slots.

In addition, a duration parameter (e.g., Duration) may indicate a total quantity of slots in consecutive groups of L slots in which a search space set may exist in each period (e.g., a range of {8, 12, . . . , 20476} slots). If the duration parameter is absent, the UE 115 may assume a quantity of L. In addition, a maximum configurable duration may be less than the configured periodicity, and a configured duration may be restricted to an integer multiple of L slots (e.g., {2L, 3L, . . . $X_p$–L}). Additionally, whether the search space can exist may depend on a slot group monitoring parameter (e.g., monitoringSlotWithinSlotGroup), which may indicate an L-bit bitmap indicating slots in which a search space exists within a group of L consecutive slots, where L=4 or 8. Each bit in the bitmap may represent a slot in a group of L slots. For example, if a bit in the bitmap has a value of 1, the search space set may exist in the corresponding slot in the group of L slots. Because of the monitoringSlotWithinSlotGroup parameter, the configured slot periodicity and offset may be restricted to be an integer multiple of L slots. The set of parameters may additionally include a PDCCH monitoring parameter (e.g., monitoringSymbolsWithinSlot), which may indicate a 14-bit bitmap indicating a starting symbol of a PDCCH monitoring occasion within a slot. Given the set of parameters, an example search space set configuration for multi-slot PDCCH monitoring may be configured with a periodicity of 16 slots, an offset of 4 slots, a duration of 8 slots, and a monitoringSlotWithinSlotGroup=1100 (e.g., L=4), which may indicate that the UE 115 is monitoring the first two slots of the four slots in the slot group.

However, some wireless communications systems may lack techniques for search space set linking for PDCCH repetition in the presence of multi-slot PDCCH monitoring (e.g., used for higher bands, 480 kHz and 960 kHz SCS). That is, the monitoringSlotWithinSlotGroup parameter for multi-slot PDCCH monitoring may lack an application to cases with PDCCH repetitions. In some examples, the PDCCH repetition may be an intra-slot PDCCH repetition in which two linked monitoring occasions of two linked search space sets may be in the same slot. For this case, existing restrictions for single-slot PDCCH monitoring may be directly reused to ensure one-to-one mapping between monitoring occasions of two linked search space sets, however some other restrictions may be used to account for the monitoringSlotWithinSlotGroup parameter. In the case of intra-slot-group PDCCH repetitions, two linked monitoring occasions of two linked search space sets may be in a same or different slot in a same slot group. In this case, additional rules may be applied to ensure one-to-one mapping between monitoring occasions of two linked search space sets.

The wireless communications system 100 may support linking a first search space set with a second search space set for PDCCH repetition monitoring when a UE 115 is operating in higher bands (e.g., FR2-2). For example, the UE 115 may use a monitoring parameter (e.g., monitoringSlotWithinSlotGroup) when two linked monitoring occasions of two linked search space sets are in a same slot (e.g., intra-slot PDCCH repetition) and when two linked monitoring occasions of two linked search space sets may be in different slots of a same slot group (e.g., intra-slot-group PDCCH repetition), where the monitoring parameter may be used to link the search space sets.

A UE 115 may receive a first message indicating a first set of parameters for a first search space set and a second set of parameters for a second search space set, and indicating that the first and second search space sets are linked (e.g., via a linking parameter). Each set of parameters may include at least one of a periodicity and offset parameter, a duration parameter, a monitoring parameter, or other parameters. In addition, the first message may indicate a first bitmap for the first search space set and a second bitmap for the second search space set, where the first and second bitmaps may include a same quantity of bits. In addition, the first bitmap and the second bitmap may indicate a quantity of slots and a location of the slots within a slot group in which a respective search space set exists within the slot group for PDCCH monitoring (e.g., via a monitoring parameter corresponding to each search space set). As such, the UE may monitor each search space set based on the respective set of parameters and in accordance with the respective bitmap, which may enable the UE to monitor two linked search space sets for intra-slot or intra-slot-group PDCCH repetition, thus reducing resource and power consumption at the UE, among other benefits.

Figure 2:
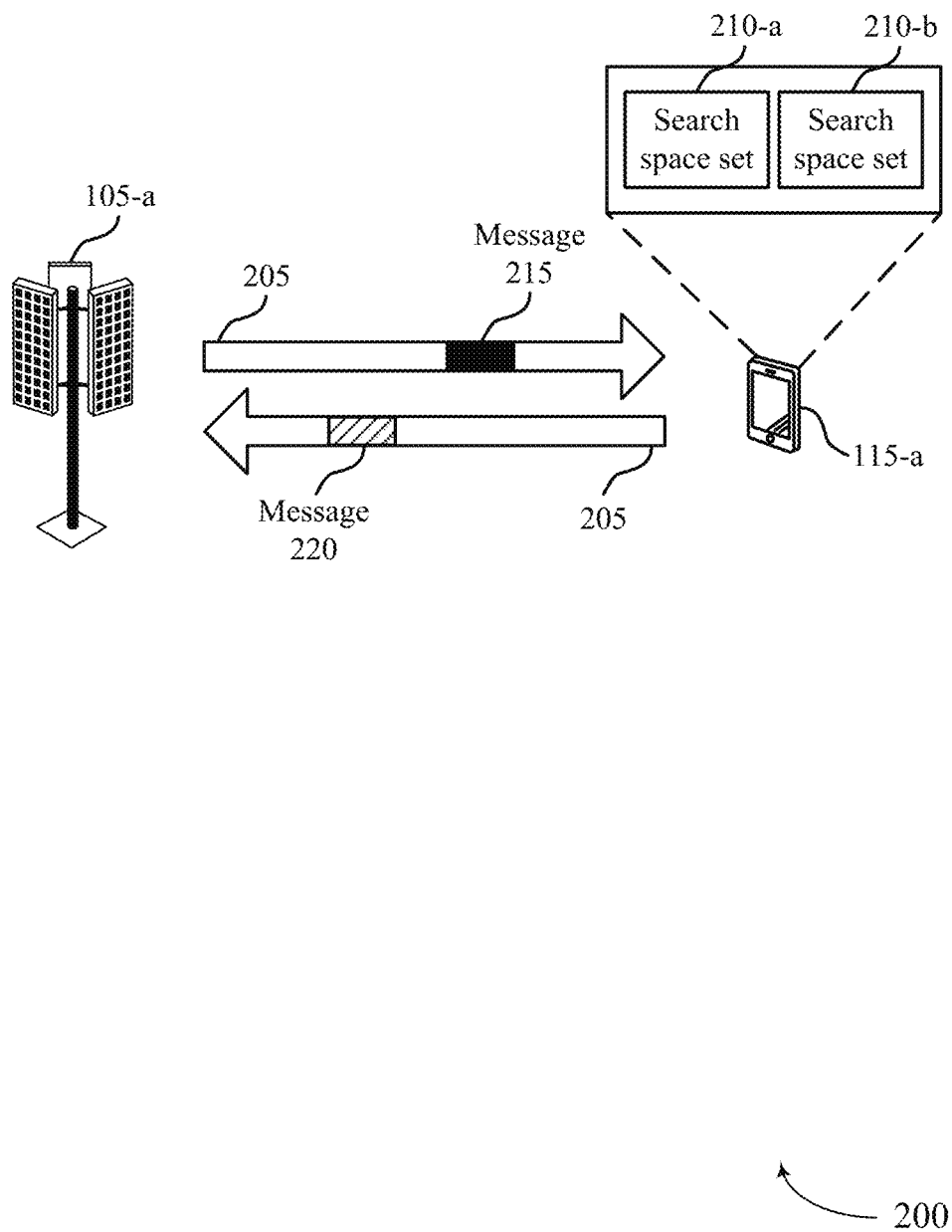
FIG. 2 illustrates an example of a wireless communications system that supports control channel repetition for higher bands in accordance with one or more aspects of the present disclosure.

FIG. 2 illustrates an example of a wireless communications system 200 that supports control channel repetition for higher bands in accordance with one or more aspects of the present disclosure. The wireless communications system 200 may implement or be implemented by aspects of the wireless communications system 100 described with reference to FIG. 1. For example, the wireless communications system 200 may include a network entity 105-a and a UE 115-a, which may be examples of corresponding devices described with reference to FIG. 1. The wireless communications system 200 may support search space sets 210 that are linked for intra-slot and intra-slot-group control channel repetition, which may support improved communications between the network entity 105-a and the UE 115-a operating in higher bands.

In some examples, the network entity 105-a may communicate with the UE 115-a over respective communication links 205 (e.g., a downlink and an uplink), which may be examples of a communication link 125 described with reference to FIG. 1. In some examples, the network entity 105-a and the UE 115-a may operate in a relatively high frequency band. For example, the network entity 105-a and the UE 115-a may operate in an FR2-2 band (e.g., 52.6 GHz to 71 GHz), which may correspond to a subcarrier spacing of 480 kHz or 960 kHz for transmissions.

The wireless communications system 200 may support search space set linking for PDCCH repetition in the presence of multi-slot PDCCH monitoring while operating in the FR2-2 or other higher bands. In some examples, the PDCCH repetition may include an intra-slot PDCCH repetition, in which two linked monitoring occasions of two linked search space sets (e.g., a search space set 210-a and a search space set 210-b) may be in a same slot. In some cases, the PDCCH repetition may include intra-slot-group PDCCH repetition, in which two linked monitoring occasions of two linked search space sets may be in a same slot group (e.g., group of slots) and in a same or different slot.

In some examples, the UE 115-a may receive a message 215 indicating configuration information for intra-slot PDCCH repetition or intra-slot-group PDCCH repetition. For example, the message 215 may indicate a first set of parameters for the search space set 210-a and a second set of parameters for the search space set 210-b. In addition, the message 215 may indicate that the search space set 210-a and the search space set 210-b are linked. That is, the message 215 may indicate a linking parameter (e.g., searchSpaceLinking) that is configured with values $s_i$ and $s_j$ representing the search space set 210-a and the search space set 210-b, respectively, and indicates that the search space set 210-a and the search space set 210-b are linked.

In addition, the message 215 may indicate a first bitmap for the search space set 210-a and second bitmap for the search space set 210-b. The first and second bitmaps may each indicate a quantity of slots and a location of the slots within a slot group in which a respective search space set 210 exists within the slot group. For example, the network entity 105-a may configure the UE 115-a with a monitoring parameter (e.g., monitoringSlotWithinSlotGroup) for each of the search space sets 210, where the monitoring parameter may include information indicative of the quantity of the slots and the locations of the slots within a slot group. Additionally, the first and second bitmaps may include a same quantity of bits (e.g., a value L corresponding to a length of the first bitmap and the second bitmap which may be the same). For example, the first bitmap and the second bitmap may each include four bits or eight bits.

The first bitmap and the second bitmap may have a same quantity of bits, but the values of the bits may differ, as indicated in the monitoring parameter for each search space set 210. In some examples of intra-slot PDCCH repetition, the first bitmap and the second bitmap may be exactly the same, which may enable the search space set 210-a and the search space set 210-b to exist in a same slot group. That is, a first monitoring parameter corresponding to the first bitmap may be the same as a second monitoring parameter corresponding to the second bitmap. Additional details relating to the search space sets 210 being linked for intra-slot PDCCH repetition are described with reference to FIG. 3.

In some examples of intra-slot-group PDCCH repetition, the first bitmap and the second bitmap may include a same quantity of first values (e.g., 1s) and a same quantity of second values (e.g., 0s), where each individual bit having the first value or the second value may be in a same or a different location in each bitmap. This may enable the UE 115-a to monitor both the search space set 210-a and the search space set 210-b in a same quantity of slots (e.g., represented by the quantity of bits having the first value) within a slot group. Additional details related to the search space sets 210 being linked for intra-slot-group PDCCH repetition are described with reference to FIG. 4.

Alternatively, in some cases of intra-slot-group PDCCH repetition, a total quantity of monitoring occasions within a slot group may be the same for the search space set 210-a and the search space set 210-b. For example, in addition to using the first bitmap and the second bitmap to monitor the respective search space sets 210 (e.g., based on the monitoring parameter), the UE 115-a may receive an indication of one or more starting symbols of one or more monitoring occasions (e.g., monitoringSymbolsWithinSlots), which may correspond to a 14-bit bitmap that indicates the one or more starting symbols of a PDDCH monitoring occasion within a slot. As such, the UE 115-a may use the first bitmap and the second bitmap corresponding to the monitoring parameter and, in some cases, a third bitmap and a fourth bitmap corresponding to the one or more starting symbols, to monitor the search space sets 210. Additional details related to the search space sets 210 being linked for intra-slot-group PDCCH repetition based on the monitoring parameter and the indication of the one or more starting symbols are described with reference to FIG. 5.

The UE 115-a may monitor the search space set 210-a based on the first set of parameters and the search space set 210-b based on the second set of parameters. For example, the UE 115-a may monitor the search space set 210-a in accordance with the first bitmap (e.g., and the corresponding monitoring parameter) and the search space set 210-b in accordance with the second bitmap (e.g., and the corresponding monitoring parameter), where the first and second bitmaps may enable the UE 115-a to link the search space sets 210. In some examples, in monitoring the first and second search spaces, the UE 115-a may monitor a first PDCCH candidate in the search space set 210-a and a second PDCCH candidate in the search space set 210-b to detect a same DCI payload in each search space set. For example, the UE 115-a may monitor each PDCCH candidate to detect DCI. In the case of PDCCH repetition, linking the two PDCCH candidates may enable the UE to detect the same DCI carrying the same information.

In some examples, the UE 115-a may transmit a message 220 indicating a capability of the UE 115-a, the capability indicating that the UE 115-a supports intra-slot PDCCH repetition or both intra-slot PDCCH repetition and intra-slot-group PDCCH repetition. In addition, the message 220 may indicate whether the UE 115-a supports search space set linking for two search space sets 210 each with more than one monitoring slots within a slot group (e.g., more than one bit with a value of 1 in the bitmap as indicated in monitoringSlotWithinSlotGroup), which may be applied to intra-slot PDCCH repetition and intra-slot-group PDCCH repetition. Alternatively, the UE 115-a may be restricted such that the UE 115-a may configure two linked search space sets 210 with only one monitoring slot within a slot group (e.g., only one bit in a bitmap with a value of 1 as indicated in monitoringSlotWithinSlotGroup). In some examples of intra-slot-group (and inter-slot) PDCCH repetition, the UE 115-a may indicate a capability of the UE 115-a in the message 220 indicating whether the UE 115-a may configure the linked search space sets 210 with different monitoring slots within a slot group with more than one monitoring occasion within a slot.

By linking the search space set 210-a and the search space set 210-b for PDCCH repetition, communications between the network entity 105-a and the UE 115-a may be improved. For example, as the monitoring parameter may be configured for each of the search space sets 210, the UE 115-a may use two or more bitmaps to link the search space sets 210 and perform PDCCH monitoring accordingly, which may increase a reliability and efficiency of transmissions, among other benefits. Additionally, configuring the UE 115-a with a set of parameters for each search space set 210 may enable the UE 115-a to monitor the search space sets 210 while operating in a relatively high frequency band (e.g., FR2-2), which may improve a throughput and data rate of communications between the network entity 105-a and the UE 115-a, among other benefits.

Figure 3:
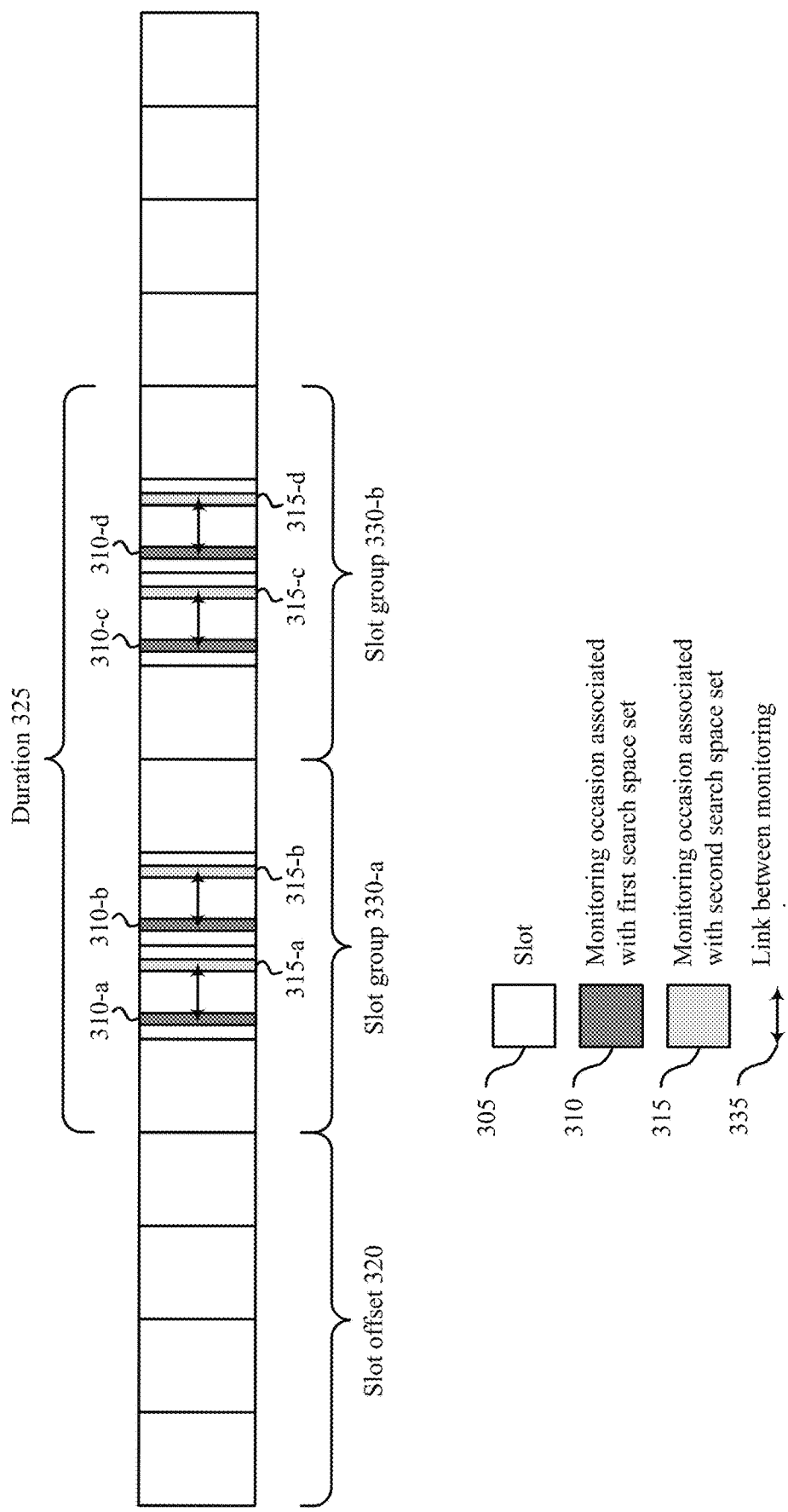
FIGS. 3 through 5 illustrate examples of control channel monitoring configurations that support control channel repetition for higher bands in accordance with one or more aspects of the present disclosure.

FIG. 3 illustrates an example of a control channel monitoring configuration 300 that supports control channel repetition for higher bands in accordance with one or more aspects of the present disclosure. The control channel monitoring configuration 300 may implement or be implemented by aspects of the wireless communications systems 100 and 200 described with reference to FIGS. 1 and 2, respectively. For example, a UE may use the control channel monitoring configuration 300 when the UE is configured with intra-slot PDCCH repetition, which may improve power and resource consumption at the UE.

As described with reference to FIG. 2, the UE may receive a first message indicating that a first search space set and a second search space set are linked, the first message indicating a respective set of parameters for the first search space set and the second search space set. In some examples, a linking parameter (e.g., searchSpaceLinking) may indicate that the first search space set and the second search space set are linked. In some cases, a monitoring parameter (e.g., monitoringSlotWithinSlotGroup) may be configured (e.g., via RRC configuration) for each search space set for multi-slot PDCCH repetition, which may enable the first search space set and the second search space set to exist in a same slot group 330 (e.g., set of slots).

In addition, the first message may indicate a first bitmap for the first search space set and a second bitmap for the second search space set, where the first bitmap and the second bitmap may include a same quantity of bits (e.g., a same value L is the same for each bitmap, where L represents a length in units of bits), where each bit may correspond to a slot 305. For example, each bitmap may include four or eight bits. In some cases, the first bitmap and the second bitmap may be the same, indicating that the first search space set and the second search space set exist in a same slot group 330. That is, a monitoring parameter corresponding to the first bitmap may be the same as a monitoring parameter corresponding to the second bitmap, where each monitoring parameter may indicate a quantity of first values and second values in the bitmap and the location of each of the first values and the second values. In some cases, the first value (e.g., a bit of value "1" in a bitmap) may correspond to a slot 305 in which a first search space set or a second search space set may exist, and the second value (e.g., a bit of value "0" in a bitmap) may correspond to a slot that lacks a first search space set or a second search space set. Based on the monitoring parameter being the same for the first search space set and the second search space set, the UE may identify that a value of each bit in the first bitmap is the same as a value of each in the second bitmap.

In addition to the monitoring parameter, the UE may be configured with a same periodicity and offset parameter (e.g., monitoringSlotPeriodicityAndOffset), a same duration parameter (e.g., Duration), and a same parameter that configures a quantity of monitoring occasions within a slot 305 (e.g., monitoringSymbolsWithinSlot) for each of the search space sets. That is, based on each parameter being the same for the first search space set and the second search space set, the search space sets may have a same periodicity, a same slot offset (e.g., a slot offset 320) a same duration (e.g., a duration 325), and a same quantity of monitoring occasions within a slot 305 (e.g., 2 monitoring occasions). As a result of each set of parameters being the same for the first search space set and the second search space set, each monitoring occasion of the first search space set may be linked (e.g., associated) with each monitoring occasion of the second search space set in a given slot 305 in which the UE monitors both search space sets. That is, there may be a one-to-one mapping of monitoring occasions for intra-slot PDCCH repetition (e.g., for the detection of a DCI format with same information).

The linked search space sets may be configured with a periodicity of 16 slots and the slot offset 320 of 4 slots. That is, the control channel monitoring configuration 300 may lack any monitoring occasions in the first four slots. In addition, the first search space set and the second search space set may be configured with a duration 325 of 8 slots, indicating a total quantity of slots 305 in consecutive slot groups 330 (e.g., of L slots) in which a first search space set, a second search space set, or both may exist in the period of 16 slots. Additionally, two monitoring occasions within a slot 305 may be configured for the first search space set and the second search space set (e.g., based on the monitoring parameter monitoringSlotWithinSlotGroup), which may be indicated it the first bitmap and second bitmap as "0110," where L=4. That is, the first bitmap and the second bitmap may each include 4 bits, where each bit may represent a slot 305 in a given slot group 330, and a value of each bit may represent whether a monitoring occasion associated with the first search space set or the second search space set is configured for that slot 305.

The UE may monitor the first search space set and the second search space set according to the first bitmap and the second bitmap. For example, a slot group 330-a may configured based on the same bitmap "0110," where a first slot and a last slot in the slot group 330-a (e.g., corresponding to the value 0 in the bitmaps) may lack any monitoring occasions, while a second slot and a third slot in the slot group 330-a (e.g., corresponding to the value 1 in the bitmaps) may include linked monitoring occasions for the first search space set and the second search space set. That is, the second slot may include a monitoring occasion 310-a associated with the first search space set linked with a monitoring occasion 315-a associated with the second search space set via a link 335. In addition, the third slot may include a monitoring occasion 310-b associated with the first search space set linked with a monitoring occasion 315-b associated with the second search space set via the link 335.

In some examples, a slot group 330-b may be configured based on the same bitmap "0110," where a first slot and a last slot in the slot group 330-b (e.g., corresponding to the value 0 in the bitmaps) may lack any monitoring occasions, while a second slot and a third slot in the slot group 330-b (e.g., corresponding to the value 1 in the bitmaps) may include linked monitoring occasions for the first search space set and the second search space set. That is, the second slot may include a monitoring occasion 310-c associated with the first search space set linked with a monitoring occasion 315-c associated with the second search space set via a link 335. In addition, the third slot may include a monitoring occasion 310-d associated with the first search space set linked with a monitoring occasion 315-d associated with the second search space set via the link 335. As such, the UE may link each monitoring occasion 310 associated with the first search space set with each monitoring occasion 315 associated with the second search space set in a first slot 305 in which the UE monitors the first search space and the second search space (e.g., the second slot of each of the slot groups 330).

In some examples, the UE may receive an indication of one or more starting symbols of a monitoring occasion (e.g., a monitoringSymbolsWithinSlot parameter) which may be indicated in a 14-bit bitmap for each search space set, each bit corresponding to a symbol within a slot 305. For example, the first search space set may correspond to a bitmap "01000000000000," which may indicate that there is one monitoring occasion 310 (e.g., corresponding to the 1 in the bitmap) that is located on a symbol of the slot 305. The second search space set may correspond to a bitmap "00000000001000," which may indicate that there is one monitoring occasion 315 (e.g., corresponding to the 1 in the bitmap) that is located on a symbol within the slot 305.

Figure 4:
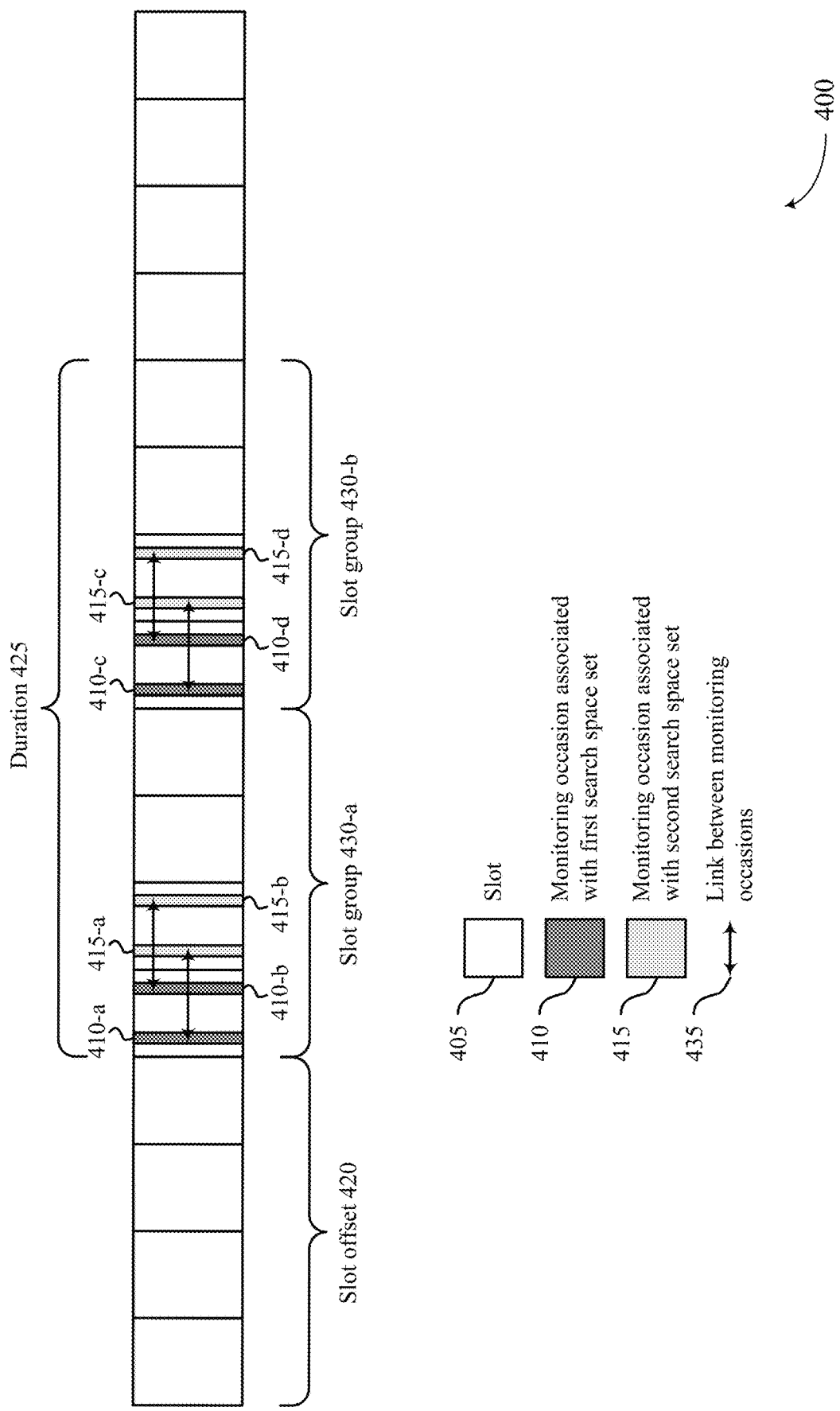

FIG. 4 illustrates an example of a control channel monitoring configuration 400 that supports control channel repetition for higher bands in accordance with one or more aspects of the present disclosure. The control channel monitoring configuration 400 may implement or be implemented by aspects of the wireless communications systems 100 and 200 described with reference to FIGS. 1 and 2, respectively. For example, a UE may use the control channel monitoring configuration 400 when the UE is configured with intra-slot-group PDCCH repetition, which may improve power and resource consumption at the UE.

As described with reference to FIG. 2, the UE may receive a first message indicating that a first search space set and a second search space set are linked, the first message indicating a respective set of parameters for the first search space set and the second search space set. In some examples, a linking parameter (e.g., searchSpaceLinking) may indicate that the first search space set and the second search space set are linked. In some cases, a monitoring parameter (e.g., monitoringSlotWithinSlotGroup) may be configured (e.g., via RRC configuration) for each search space set for multi-slot PDCCH repetition.

In addition, the first message may indicate a first bitmap for the first search space set and a second bitmap for the second search space set, where the first bitmap and the second bitmap may include a same quantity of bits (e.g., a same value L is the same for each bitmap, where L represents a length in units of bits), where each bit may correspond to a slot 405. For example, each bitmap may include four or eight bits. In some examples, the first bitmap and the same bitmap may include a same quality of first values (e.g., bits with a value 1) and second values (e.g., bits with a value 0), which may enable the UE to monitor the first search space and the second search space in a same quantity of slots 405 within a same slot group 430. A monitoring parameter may indicate the same quantity of first values and second values for the first search space and the second search space set, where the first values and the second values may be in a same location or a different location of the first bitmap and the second bitmap. Put another way, the UE may identify that the first bitmap and the second bitmap include a same quantity of first and second values (e.g., 1s and 0s) based on the monitoring parameter indicating the same quantity of first and second values for the first and second search space sets, where the first and second values may be in a same location or a different location of the first bitmap and the second bitmap. Accordingly, the UE may monitor the first search space set and the second search space set in the same quantity of slots 405 based on identifying that the first and second bitmaps include a same quantity of first and second values.

In some examples, an $i^{th}$ slot 405 within a slot group 430 corresponding to the first search space set may be linked (e.g., associated) with an $i^{th}$ slot 405 within a slot group 430 corresponding to the second search space set, where i may represent a first bit that has a value of 1 in a bitmap. For example, the UE may link a first instance within a first slot group 430 of the first search space set with a first instance within a second slot group 430 (e.g., $i^{th}$ slots 405), where the first instance in each respective slot group 430 corresponds to a first instance of a first value in the respective bitmap.

In addition to the monitoring parameter, the UE may be configured with a same periodicity and offset parameter (e.g., monitoringSlotPeriodicityAndOffset), a same duration parameter (e.g., Duration), and a same parameter that may configure a quantity of monitoring occasions within a slot 405 (e.g., monitoringSymbolsWithinSlot) for each of the search space sets. That is, based on each parameter being the same for the first search space set and the second search space set, the search space sets may have a same periodicity, a same slot offset (e.g., a slot offset 420), a same duration (e.g., a duration 425), and a same quantity of monitoring occasions within a slot 405 (e.g., 2 monitoring occasions).

As a result of these parameters being the same for the first search space set and the second search space set, monitoring occasions 410 associated with the first search space set may be linked with monitoring occasions 415 associated with the second search space set. For example, a $k^{th}$ monitoring occasion 410 of the $i^{th}$ slot 405 within a slot group 430 of the first search space set may be linked with a $k^{th}$ monitoring occasion 415 of the $i^{th}$ slot 405 within a slot group 430 of the second search space set. That is, the UE may link a first instance of a monitoring occasion 410 of the first instance (e.g., the $i^{th}$ slot 405) within the slot group 430 with a first instance of a monitoring occasion 415 of the first instance (e.g., the $i^{th}$ slot 405) within the slot group 430.

As a result, each monitoring occasion 410 associated with the first search space set may be linked with each monitoring occasion 415 associated with the second search space set in a given slot group 430 in which both search space sets are monitored, which may result in a one-to-one mapping of monitoring occasions 410 and monitoring occasions 415 for intra-slot-group PDCCH repetition (e.g., for detection of a DCI format with same information). For example, the linked search space sets may be configured with a periodicity of 16 slots and the slot offset 420 of 4 slots. That is, the control channel monitoring configuration 400 may lack any monitoring occasions in the first four slots. In addition, the first search space set and the second search space set may be configured with a duration 425 of 8 slots, indicating a total quantity of slots 405 in consecutive slot groups 430 (e.g., of L slots) in which a first search space set, a second search space set, or both may exist in the period of 16 slots. Additionally, one monitoring occasion 410 within a slot may be configured for the first search space set and one monitoring occasion 415 within the slot may be configured for the second search space set (e.g., based on respective parameters monitoringSlotWithinSlotGroup). Such information may be indicated in the first bitmap as "1000," where L=4, and in the second bitmap as "0100," where L=4. That is, the first bitmap and the second bitmap may each include 4 bits, where each bit may represent a slot 405 in a given slot group 430 and a value of each bit may represent whether a monitoring occasion 410 associated with the first search space set of a monitoring occasion 415 associated with the second search space set is configured for that slot 405.

Given the first bitmap, the UE may monitor the first search space set in a first slot 405 of a slot group 430 and the second search space in a second slot 405 of the slot group 430. For example, a slot group 430-$a$ may configured based on the first bitmap and the second bitmap, such that the first and second slots in the slot group 430-$a$ include monitoring occasions associated with either the first search space set or the second search space set which may be linked. In some examples, the first slot may include a monitoring occasion 410-$a$ and a monitoring occasion 410-$b$, each associated with the first search space set linked, and the second slot may include a monitoring occasion 415-$a$ and a monitoring occasion 415-$b$, each associated with the second search space set, where the monitoring occasion 410-$a$ may be linked with the monitoring occasion 415-$a$ via a link 435 and the monitoring occasion 410-$b$ may be linked with the monitoring occasion 415-$b$ via a link 435. In addition, a slot group 430-$b$ may configured based on the first bitmap and the second bitmap, such that the first and second slots in the slot group 430-$b$ include monitoring occasions associated with either the first search space set or the second search space set which may be linked. In some examples, the first slot may include a monitoring occasion 410-$c$ and a monitoring occasion 410-$d$ each associated with the first search space set linked, and the second slot may include a monitoring occasion 415-$c$ and a monitoring occasion 415-$d$ each associated with the second search space set, where the monitoring occasion 410-$c$ may be linked with the monitoring occasion 415-$c$ via a link 435 and the monitoring occasion 410-$d$ may be linked with the monitoring occasion 415-$d$ via a link 435.

In some examples, the UE may receive an indication of one or more starting symbols of a monitoring occasion (e.g., a monitoringSymbolsWithinSlot parameter) which may be indicated in a 14-bit bitmap for each search space set, each bit corresponding to a symbol within a slot 405. For example, the first search space set may correspond to a bitmap "01000000001000," which may indicate that there are two monitoring occasions 410 (e.g., corresponding to the is in the bitmap) that are located in particular symbols of the slot 405. The second search space set may correspond to a bitmap "00000100001000," which may indicate that there are two monitoring occasions 415 (e.g., corresponding to the is in the bitmap) that are located in particular symbols of the slot 405.

Figure 5:
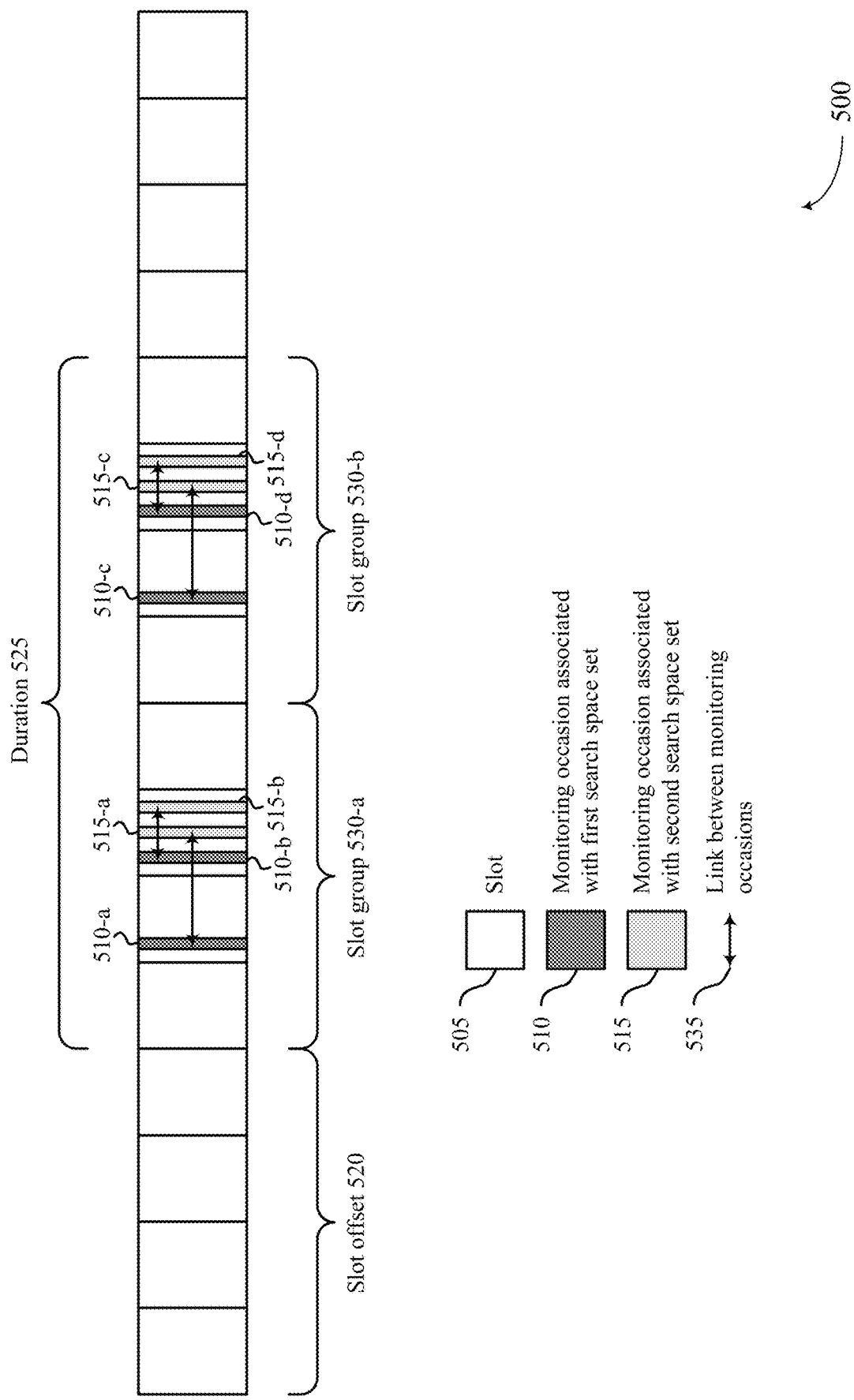

FIG. 5 illustrates an example of a control channel monitoring configuration 500 that supports control channel repetition for higher bands in accordance with one or more aspects of the present disclosure. The control channel monitoring configuration 500 may implement or be implemented by aspects of the wireless communications systems 100 and 200 described with reference to FIGS. 1 and 2, respectively. For example, a UE may use the control channel monitoring configuration 500 when the UE is configured with intra-slot-group PDCCH repetition, which may improve power and resource consumption at the UE.

As described with reference to FIG. 2, the UE may receive a first message indicating that a first search space set and a second search space set are linked, the first message indicating a respective set of parameters for the first search space set and the second search space set. In some examples, a linking parameter (e.g., searchSpaceLinking) may indicate that the first search space set and the second search space set are linked. In some cases, a monitoring parameter (e.g., monitoringSlotWithinSlotGroup) may be configured (e.g., via RRC configuration) for each search space set for multi-slot PDCCH repetition.

In addition, the first message may indicate a first bitmap for the first search space set and a second bitmap for the second search space set, where the first bitmap and the second bitmap may include a same quantity of bits (e.g., a same value L is the same for each bitmap, where L represents a length in units of bits), where each bit may correspond to a slot 505. For example, each bitmap may include four or eight bits. In some examples, the first message may indicate one or more starting symbols of one or more monitoring occasions within a slot 505 that corresponds to a third bitmap for the first search space set and a fourth bitmap for the second search space set, where the third bitmap and the fourth bitmap may be 14-bit bitmaps configured by a parameter (e.g., monitoringSymbolsWithinSlot).

In some examples, using the monitoring parameter (e.g., monitoringSlotWithinSlotGroup) and the indication of the one or more starting symbols (e.g., monitoringSymbolsWithinSlot), the UE may identify that a first product between a quantity of first values (e.g., 1s) in the first bitmap and a quantity of first values in the third bitmap is equal to a second product between a quantity of first values in the second bitmap and a quantity of first values in the fourth bitmap. That is, if the quantity of first values in the monitoring parameter for the first search space set is represented as $g_1$, the quantity of first values in the monitoring parameter for the second search space set is represented as $g_2$, the quantity of first values in the indication of the one or more starting symbols for the first search space set is represented as $h_1$, and the quantity of first values in the indication of the one or more starting symbols for the second search space set is represented as $h_2$, then the UE may identify that $g_1 h_1 = g_2 h_2$. As a result, a total quantity of monitoring occasions 510 corresponding to the first search space set and a total quantity of monitoring occasions 515 corresponding to the second search space set are the same within a slot group 530. In addition, the quantity of first values indicated in the monitoring parameter for the first search space set (e.g., $g_1$) and the second search space set (e.g., $g_2$) may be the same or different, and the quantity of first values indicated in the indication of the one or more starting symbols for the first search space set (e.g., $h_1$) and the second search space set (e.g., $h_2$) may be the same or different.

Given the condition that $g_1 h_1 = g_2 h_2$, the $i^{th}$ monitoring occasion 510 within a slot group 530 may be linked with the $i^{th}$ monitoring occasion 515 within the slot group 530, where i=1, 2, . . . , $g_1 h_1 = g_2 h_2$. In addition, the UE may be configured with a same periodicity and offset parameter (e.g., monitoringSlotPeriodicityAndOffset) and a same duration parameter (e.g., Duration) for each of the search space sets. That is, based on the respective parameters being the same for the first search space set and the second search space set, the search space sets may have a same periodicity, a same slot offset (e.g., a slot offset 420), and a same duration (e.g., a duration 525). For example, the linked search space sets may be configured with a periodicity of 16 slots and the slot offset 520 of 4 slots. That is, the control channel monitoring configuration 500 may lack any monitoring occasions in the first four slots. In addition, the first search space set and the second search space set may be configured with the duration 525 of 8 slots, indicating a total quantity of slots 505 in consecutive slot groups 530 (e.g., of L slots) in which a first search space set, a second search space set, or both may exist in the period of 16 slots.

Additionally, two monitoring occasions 510 within a slot group 530 may be configured for the first search space set and two monitoring occasions 515 within the slot group 530 may be configured for the second search space set (e.g., based on the respective monitoringSlotWithinSlotGroup parameters), which may be indicated in the first bitmap as "1100," where L=4 and $g_1$=2, and in the second bitmap as "0100," where L=4 and $g_1$=1. That is, the first bitmap and the second bitmap may each include 4 bits, where each bit may represent a slot 505 in a given slot group 530 and a value of each bit may represent whether one of a monitoring occasion 510 associated with the first search space set or a monitoring occasion 515 associated with the second search space set is configured for that slot 505. In some examples, the UE may receive an indication of one or more starting symbols of a monitoring occasion (e.g., a monitoringSymbolsWithinSlot parameter) which may be indicated in a 14-bit bitmap for each search space set, each bit corresponding to a symbol within a slot 505. For example, the first search space set may correspond to a bitmap "01000000000000," which may indicate that there is one monitoring occasion 510 (e.g., corresponding to the 1 in the bitmap) located in a symbol of the slot 505, where $h_1$=1. The second search space set may correspond to a bitmap "00000100001000," which may indicate that there are two monitoring occasions 515 (e.g., corresponding to the is in the bitmap) that are located in particular symbols of the slot 505, where $h_2$=2. As such, $g_1 h_1 = g_2 h_2 = 2$.

Accordingly, a slot group 530-a may configured such that the first and second slots in the slot group 530-a include monitoring occasions associated with either the first search space set or the second search space set which may be linked. In some examples, the first slot may include a monitoring occasion 510-a associated with the first search space set, and the second slot may include a monitoring occasion 510-b associated with the first search space set, and a monitoring occasion 515-a and a monitoring occasion 515-b, each associated with the second search space set, where the monitoring occasion 510-a may be linked with the monitoring occasion 515-a via a link 535 and the monitoring occasion 510-b may be linked with the monitoring occasion 515-b via a link 535. In addition, the first slot of a slot group 530-b may include a monitoring occasion 510-c associated with the first search space set, and a second slot of the slot group 530-b may include a monitoring occasion 510-b associated with the first search space set and a monitoring occasion 515-c and a monitoring occasion 515-d each associated with the second search space set, where the monitoring occasion 510-c may be linked with the monitoring occasion 515-c via a link 535 and the monitoring occasion 510-d may be linked with the monitoring occasion 515-d via a link 535. As such, the UE may monitor the first search space set and the second search space set where the total quantity of monitoring occasions for the first and second search space sets within a slot group 530 is the same.

Figure 6:
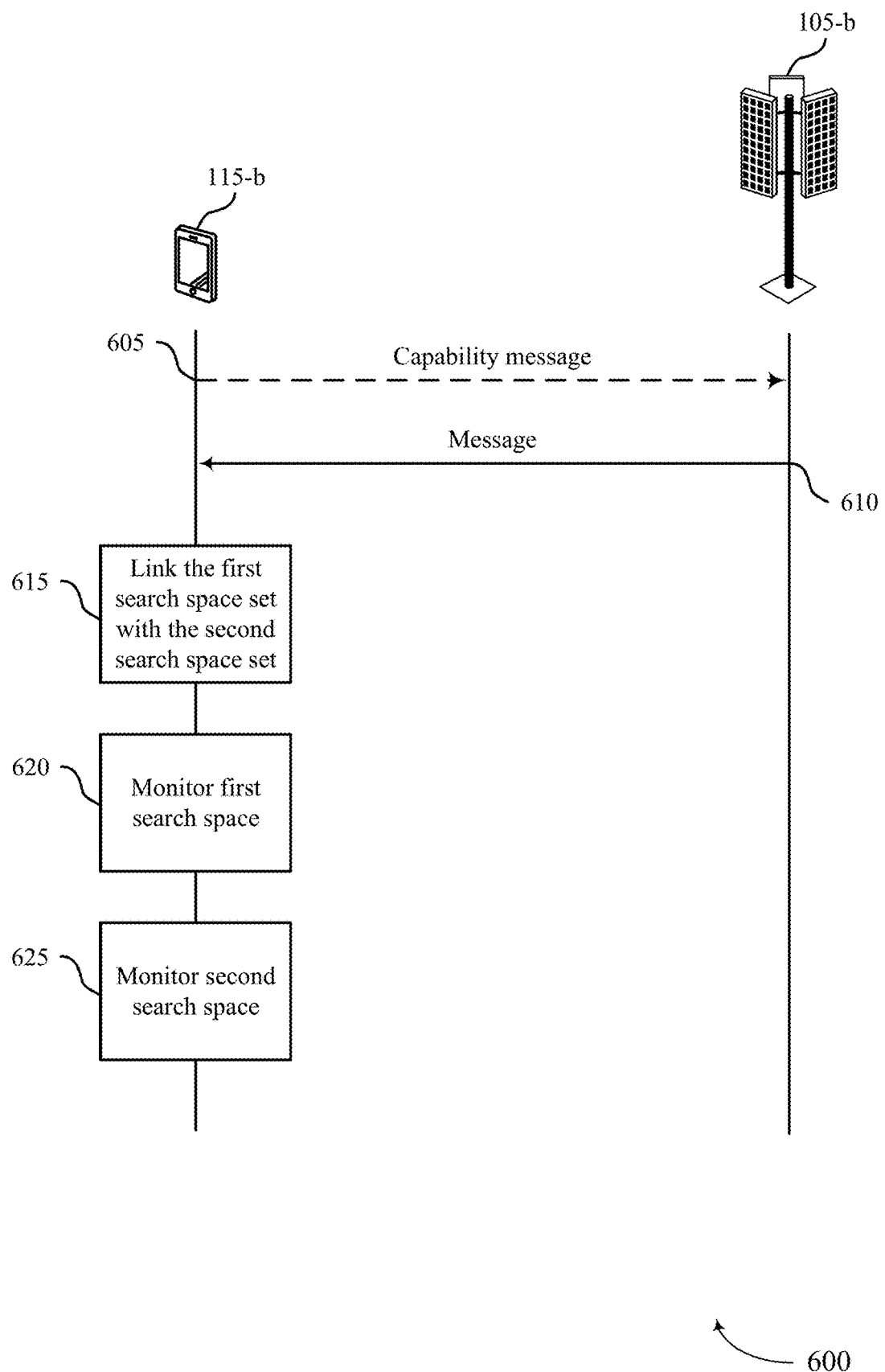
FIG. 6 illustrates an example of a process flow that supports control channel repetition for higher bands in accordance with one or more aspects of the present disclosure.

FIG. 6 illustrates an example of a process flow 600 that supports control channel repetition for higher bands in accordance with one or more aspects of the present disclosure. The process flow 600 may implement aspects of wireless communications systems 100 and 200, or may be implemented by aspects of the wireless communications system 100 and 200. For example, the process flow 600 may illustrate operations between a UE 115-*b* and a network entity 105-*b*, which may be examples of corresponding devices described herein. In the following description of the process flow 600, the operations between the UE 115-*b* and the network entity 105-*b* may be transmitted in a different order than the example order shown, or the operations performed by the UE 115-*b* and the network entity 105-*b* may be performed in different orders or at different times. Some operations may also be omitted from the process flow 600, and other operations may be added to the process flow 600.

At 605, the UE 115-*b* may transmit a message to the network entity 105-*b* indicating a capability of the UE 115-*b* to monitor a first search space set and a second search space set in one or more slots, in one or more group of slots, or a combination thereof. For example, the capability may indicate whether the UE 115-*b* supports intra-slot PDCCH repetition or intra-slot PDCCH repetition and intra-slot-group PDCCH repetition.

At 610, the UE 115-*b* may receive a message from the network entity 105-*b* indicating a first set of parameters for a first search space set, a second set of parameters for a second search space set, an indication that the first search space set and the second search space set are linked, a first bitmap for the first search space set, and a second bitmap for the second search space set. The first bitmap and the second bitmap may include a same quantity of bits (e.g., corresponding to a length of value L), and may indicate a quantity of slots and a location of the slots within a group of slots in which a respective search space set exists within the group of slots. In some examples, the UE 115-*a* may receive the first message whether the UE 115-*b* is configured for intra-slot PDCCH repetition or intra-slot-group PDCCH repetition. In addition, the first search space set and the second search space set may be linked based on a linking parameter (e.g., searchSpaceLinking) indicated in the message.

At 615, the UE 115-*b* may link the first search space set with the second search space set based on a monitoring parameter (e.g., monitoringSlotWithinSlotGroup), which may configure the first bitmap and the second bitmap. For example, the UE 115-*b* may link each monitoring occasion of the first search space set with each monitoring occasion of the second search space set in a given slot in which the UE 115-*b* monitors both search space sets (e.g., providing a one-to-one mapping of monitoring occasions for intra-slot PDCCH repetition). In some examples, each monitoring occasion of the first search space set may be linked with each monitoring occasion of the second search space set in a given slot group in which the UE 115-*b* monitors both search space sets (e.g., providing a one-to-one mapping of monitoring occasions for intra-slot-group PDCCH repetition). Alternatively, the UE 115-*b* may link monitoring occasions for each search space set such that a total number of monitoring occasions within a slot group in which the UE 115-*a* monitors for both search space sets is the same.

At 620, the UE 115-*b* may monitor the first search space set based on the first set of parameters and in accordance with the first bitmap. At 625, the UE 115-*b* may monitor the second search space set based on the second set of parameters and in accordance with the second bitmap. For example, in monitoring the first and second search space sets, the UE 115-*b* may monitor a first PDCCH candidate in the first search space set and a second PDCCH candidate in the second search space set to detect a same DCI payload.

Figure 7:
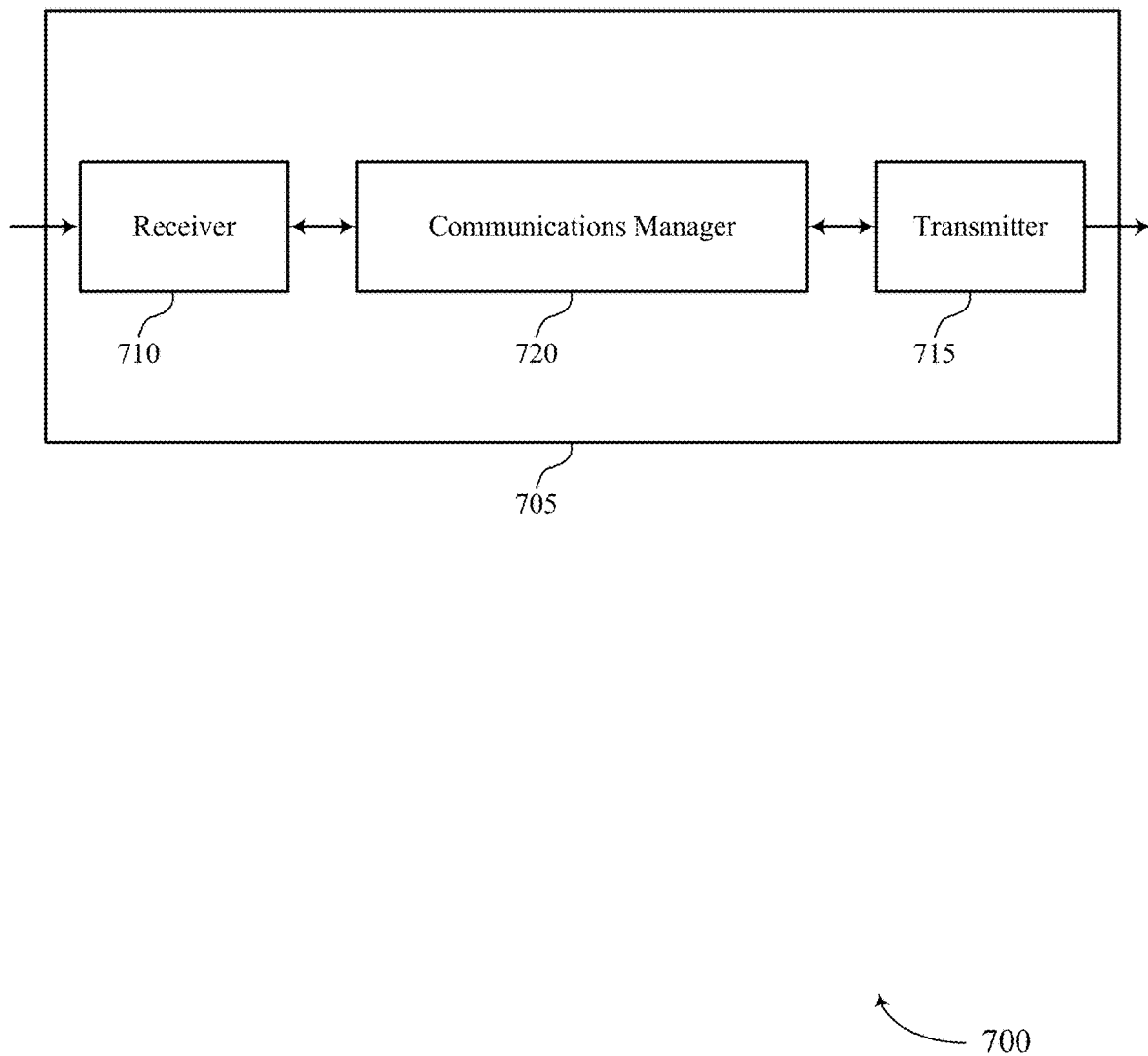
FIGS. 7 and 8 show block diagrams of devices that support control channel repetition for higher bands in accordance with one or more aspects of the present disclosure.

FIG. 7 shows a block diagram 700 of a device 705 that supports control channel repetition for higher bands in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to control channel repetition for higher bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to control channel repetition for higher bands). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of control channel repetition for higher bands as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 720 may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a UE in accordance with examples as disclosed herein. For example, the communications manager 720 may be configured as or otherwise support a means for receiving a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits. The communications manager 720 may be configured as or otherwise support a means for monitoring the first search space set based at least part on the first set of parameters and in accordance with the first bitmap. The communications manager 720 may be configured as or otherwise support a means for monitoring the second search space set based at least part on the second set of parameters and in accordance with the second bitmap.

By including or configuring the communications manager 720 in accordance with examples as described herein, the device 705 (e.g., a processor controlling or otherwise coupled with the receiver 710, the transmitter 715, the communications manager 720, or a combination thereof) may support techniques for linking search space sets for intra-slot and intra-group-slot PDCCH monitoring, which may enable a UE to monitor the search space sets while operating in a relatively high frequency band and without increasing power and resource consumption. As such, the described techniques may support improved communications between the UE and other wireless communication devices.

Figure 8:
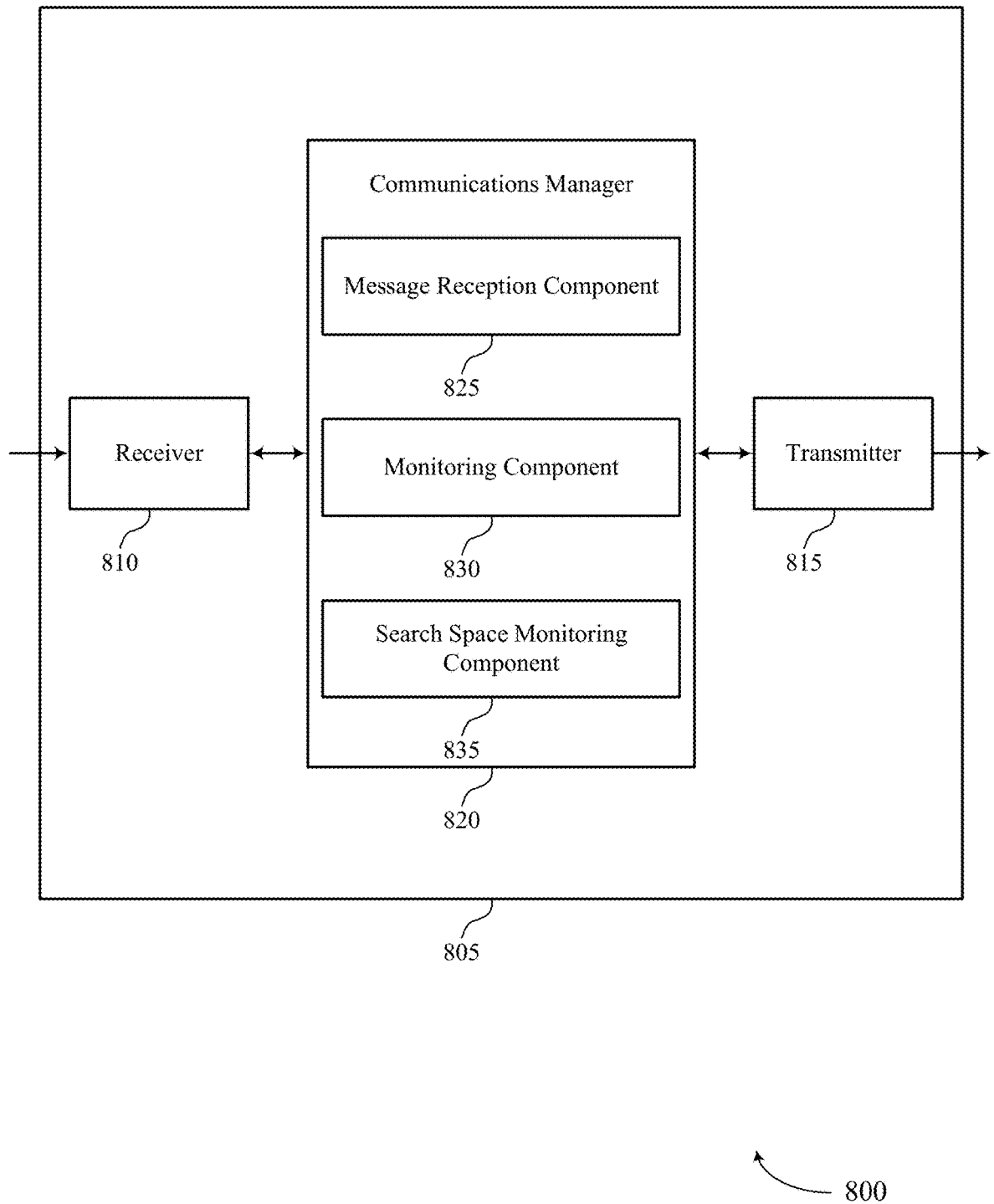

FIG. 8 shows a block diagram 800 of a device 805 that supports control channel repetition for higher bands in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to control channel repetition for higher bands). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to control channel repetition for higher bands). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of control channel repetition for higher bands as described herein. For example, the communications manager 820 may include a message reception component 825, a monitoring component 830, a search space monitoring component 835, or any combination thereof. The communications manager 820 may be an example of aspects of a communications manager 720 as described herein. In some examples, the communications manager 820, or various components thereof, may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication at a UE in accordance with examples as disclosed herein. The message reception component 825 may be configured as or otherwise support a means for receiving a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits. The monitoring component 830 may be configured as or otherwise support a means for monitoring the first search space set based at least part on the first set of parameters and in accordance with the first bitmap. The search space monitoring component 835 may be configured as or otherwise support a means for monitoring the second search space set based at least part on the second set of parameters and in accordance with the second bitmap.

Figure 9:
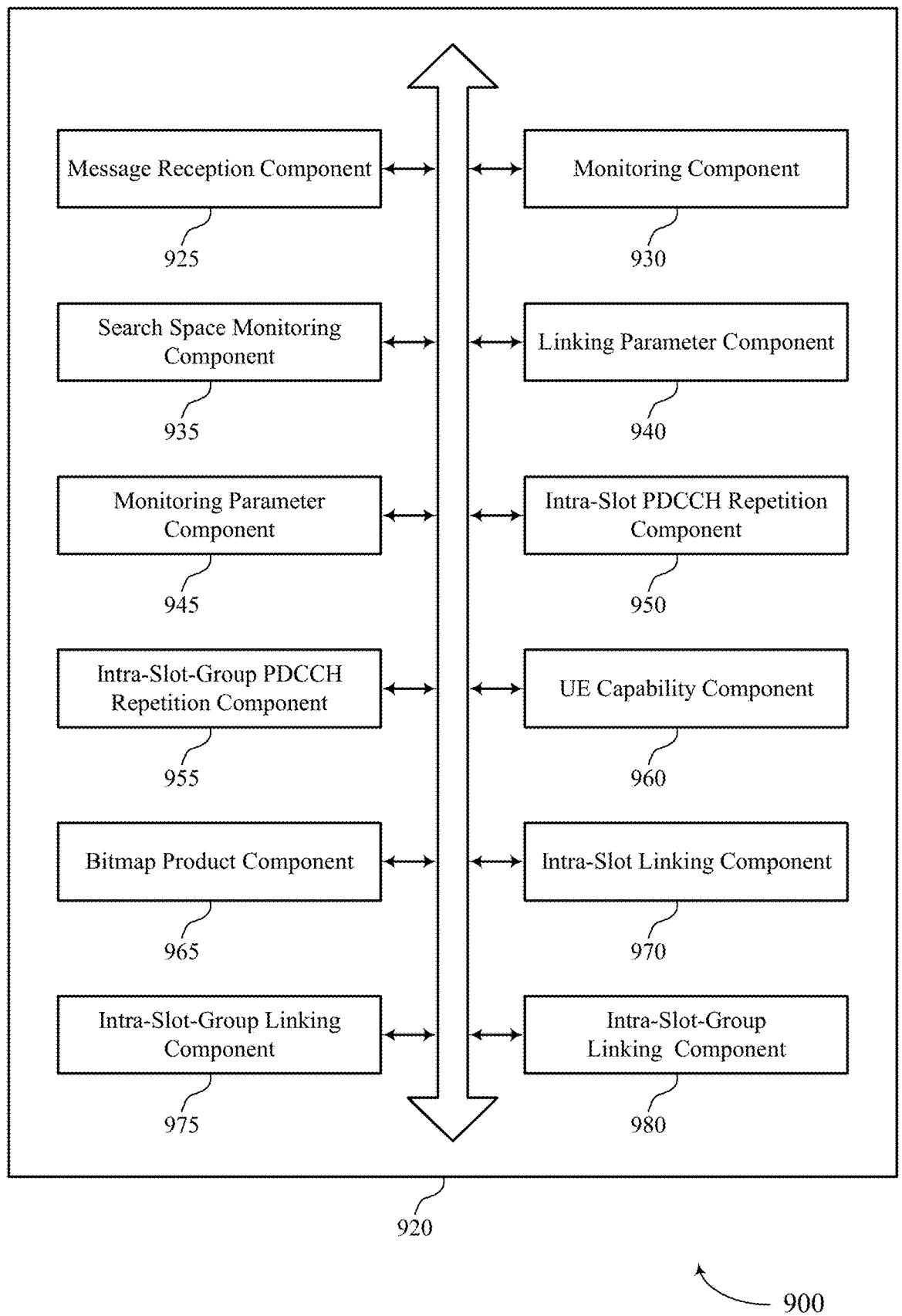
FIG. 9 shows a block diagram of a communications manager that supports control channel repetition for higher bands in accordance with one or more aspects of the present disclosure.

FIG. 9 shows a block diagram 900 of a communications manager 920 that supports control channel repetition for higher bands in accordance with one or more aspects of the present disclosure. The communications manager 920 may be an example of aspects of a communications manager 720, a communications manager 820, or both, as described herein. The communications manager 920, or various components thereof, may be an example of means for performing various aspects of control channel repetition for higher bands as described herein. For example, the communications manager 920 may include a message reception component 925, a monitoring component 930, a search space monitoring component 935, a linking parameter component 940, a monitoring parameter component 945, an intra-slot PDCCH repetition component 950, an intra-slot-group PDCCH repetition component 955, a UE capability component 960, a bitmap product component 965, an intra-slot linking component 970, an intra-slot-group linking component 975, an intra-slot-group linking component 980, or any combination thereof. Each of these components may communicate, directly or indirectly, with one another (e.g., via one or more buses).

The communications manager 920 may support wireless communication at a UE in accordance with examples as disclosed herein. The message reception component 925 may be configured as or otherwise support a means for receiving a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits. The monitoring component 930 may be configured as or otherwise support a means for monitoring the first search space set based at least part on the first set of parameters and in accordance with the first bitmap. The search space monitoring component 935 may be configured as or otherwise support a means for monitoring the second search space set based at least part on the second set of parameters and in accordance with the second bitmap.

In some examples, to support receiving the first message, the linking parameter component 940 may be configured as or otherwise support a means for receiving the first message indicating that a linking parameter is configured with a first value corresponding to the first search space set and a second value corresponding to the second search space set, where the indication that the first search space set and the second search space set are linked is based at least part on the linking parameter.

In some examples, to support receiving the first message, the monitoring parameter component 945 may be configured as or otherwise support a means for receiving the first message indicating that a monitoring parameter is configured for each of the first search space set and the second search space set, where the indication of the quantity of slots and the location of the slots within the group of slots is based at least part on the monitoring parameter.

In some examples, the intra-slot PDCCH repetition component 950 may be configured as or otherwise support a means for identifying that a value of each bit in the first bitmap is the same as a value of each bit in the second bitmap based at least part on the monitoring parameter being the same for the first search space set and the second search space set.

In some examples, the intra-slot linking component 970 may be configured as or otherwise support a means for linking each monitoring occasion of a plurality of multiple monitoring occasions of the first search space set with each monitoring occasion of a plurality of multiple monitoring occasions of the second search space set in a first slot in which the first search space set and the second search space set are monitored.

In some examples, the intra-slot-group PDCCH repetition component 955 may be configured as or otherwise support a means for identifying that the first bitmap and the second bitmap include a same quantity of first values and second values based at least part on the monitoring parameter indicating the same quantity of first values and second values for the first search space set and the second search space set, where the first values and second values are in a same location or a different location of the first bitmap and the second bitmap.

In some examples, the intra-slot-group PDCCH repetition component 955 may be configured as or otherwise support a means for monitoring the first search space set and the second search space set in the same quantity of slots based at least part on identifying that the first bitmap and the second bitmap include a same quantity of first values and second values.

In some examples, the intra-slot-group linking component 975 may be configured as or otherwise support a means for linking a first instance within a first group of slots of the first search space set with a first instance within a second group of slots of the second search space set, where the first instance within the first group of slots corresponds to a first instance of a first value in the first bitmap and the first instance within the second group of slots corresponds to a first instance of the first value in the second bitmap.

In some examples, the intra-slot-group linking component 980 may be configured as or otherwise support a means for linking a first instance of a monitoring occasion of the first instance within the first group of slots of the first search space set with a first instance of a monitoring occasion of the first instance within the second group of slots of the second search space set.

In some examples, the intra-slot-group linking component 975 may be configured as or otherwise support a means for linking each monitoring occasion of a plurality of multiple monitoring occasions of the first search space set with each monitoring occasion of a plurality of multiple monitoring occasions of the second search space set in a first group of slots in which the first search space set and the second search space set are monitored.

In some examples, to support receiving the first message, the bitmap product component 965 may be configured as or otherwise support a means for receiving the first message indicating one or more starting symbols of one or more monitoring occasions within a slot that corresponds to a third bitmap for the first search space set and a fourth bitmap for the second search space set. In some examples, to support receiving the first message, the bitmap product component 965 may be configured as or otherwise support a means for identifying that a first product between a quantity of first values in the first bitmap of the first search space set and a quantity of first values in the third bitmap for the first search space set is equal to a second product between a quantity of first values in the second bitmap of the second search space set and a quantity of first values in the fourth bitmap for the second search space set.

In some examples, the bitmap product component 965 may be configured as or otherwise support a means for linking a first instance of a monitoring occasion within a first group of slots of the first search space set with a first instance of a monitoring occasion within a second group of slots of the second search space set.

In some examples, a periodicity, a slot offset, and a duration are the same for the first search space set and the second search space set based at least part on a first product between a quantity of first values in the first bitmap of the first search space set and a quantity of first values in the third bitmap for the first search space set being equal to a second product between a quantity of first values in the second bitmap of the second search space set and a quantity of first values in the fourth bitmap for the second search space set.

In some examples, to support receiving the first message, the bitmap product component 965 may be configured as or otherwise support a means for receiving the first message indicating one or more starting symbols of one or more monitoring occasions within a slot that corresponds to a third bitmap for each of the first search space set and the second search space set. In some examples, to support receiving the first message, the bitmap product component

965 may be configured as or otherwise support a means for identifying that a first product between a quantity of first values in the first bitmap of the first search space set and a quantity of first values in the third bitmap for the first search space set is equal to a second product between a quantity of first values in the second bitmap of the second search space set and a quantity of first values in the third bitmap for the second search space set.

In some examples, a periodicity, a slot offset, a duration, and a quantity of monitoring occasions within a slot are the same for the first search space set and the second search space set based at least part on the first bitmap and the second bitmap being the same. In some examples, a periodicity, a slot offset, a duration, and a quantity of monitoring occasions within a slot are the same for the first search space set and the second search space set based at least part on the first bitmap and the second bitmap having a same quantity of first values and second values.

In some examples, the UE capability component 960 may be configured as or otherwise support a means for transmitting a second message indicating a capability of the UE to monitor the first search space set and the second search space set in one or more slots, in one or more groups of slots, or a combination thereof.

In some examples, to support transmitting the second message, the UE capability component 960 may be configured as or otherwise support a means for transmitting the second message indicating the capability of the UE to link the first search space set and the second search space set each with more than one monitoring slots within a group of slots.

In some examples, to support transmitting the second message, the UE capability component 960 may be configured as or otherwise support a means for transmitting the second message indicating the capability of the UE to configure the first search space set linked to the second search space set with different monitoring slots within a group of slots with more than one monitoring occasions within a slot.

In some examples, the monitoring component 930 may be configured as or otherwise support a means for monitoring a first control channel candidate in the first search space set and a second control channel candidate in the second search space set to detect a same DCI payload.

Figure 10:
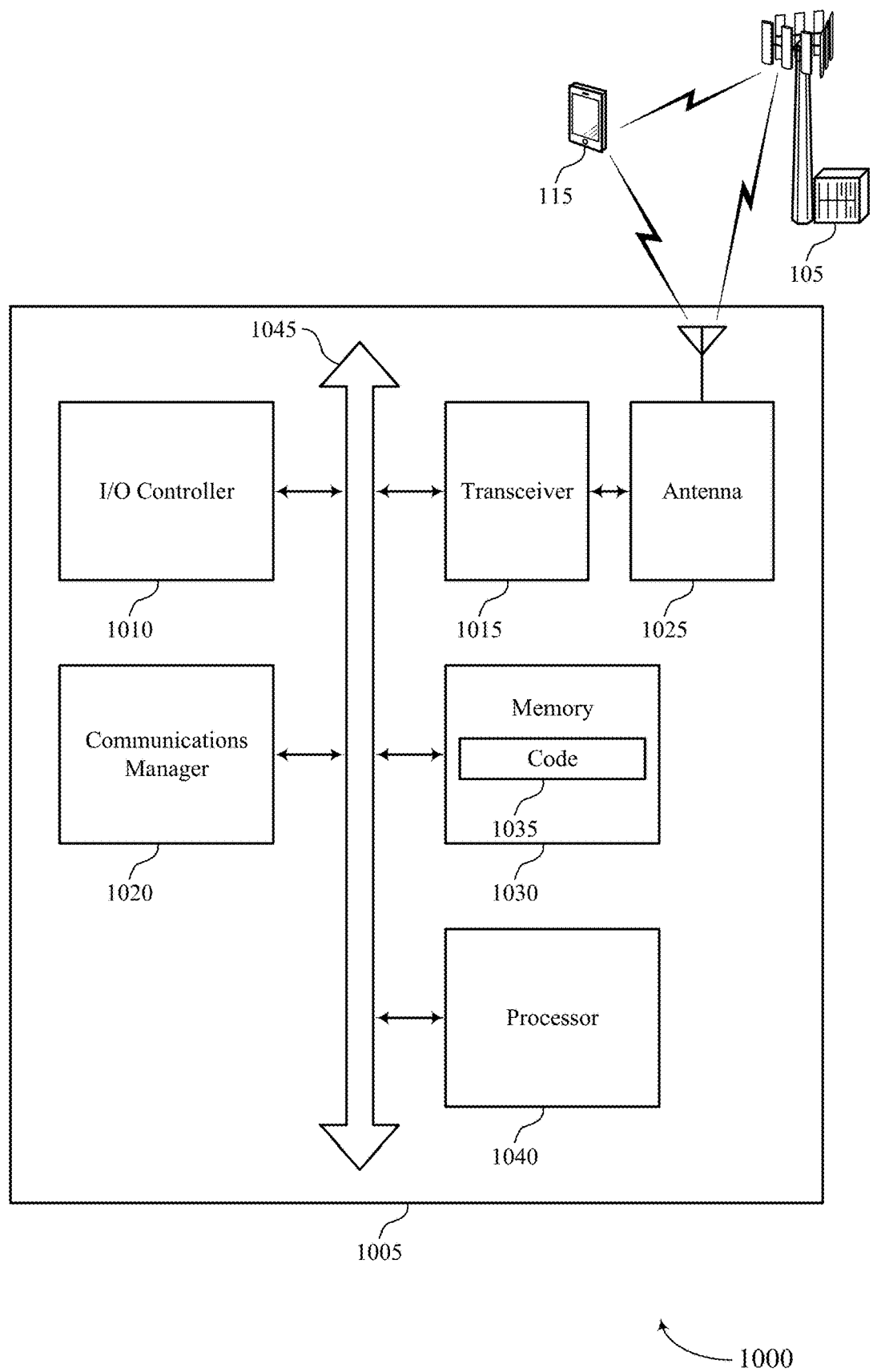
FIG. 10 shows a diagram of a system including a device that supports control channel repetition for higher bands in accordance with one or more aspects of the present disclosure.

FIG. 10 shows a diagram of a system 1000 including a device 1005 that supports control channel repetition for higher bands in accordance with one or more aspects of the present disclosure. The device 1005 may be an example of or include the components of a device 705, a device 805, or a UE 115 as described herein. The device 1005 may communicate (e.g., wirelessly) with one or more network entities 105, one or more UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally, or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting control channel repetition for higher bands). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communication at a UE in accordance with examples as disclosed herein. For example, the communications manager 1020 may be configured as or otherwise support a means for receiving a first message indicating a first set of parameters for a first search space set, a second set of parameters for a second search space set, an indication that the first search space set and the second search space set are linked, a first bitmap for the first search space set, and a second bitmap for the second search space set, where the first bitmap and the second bitmap indicate a quantity of slots and a location of the slots within a group of slots in which a respective search space set exists within the group of slots, and where the first bitmap and the second bitmap are a same quantity of bits. The communications manager 1020 may be configured as or otherwise support a means for monitoring the first search space set based at least part on the first set of parameters and in accordance with the first bitmap. The communications manager 1020 may be configured as or otherwise support a means for monitoring the second search space set based at least part on the second set of parameters and in accordance with the second bitmap.

By including or configuring the communications manager 1020 in accordance with examples as described herein, the device 1005 may support techniques for linking search space sets for intra-slot and intra-group-slot PDCCH monitoring, which may enable a UE to monitor the search space sets while operating in a relatively high frequency band and without increasing power and resource consumption. As such, the described techniques may support improved communications between the UE and other wireless communication devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of control channel repetition for higher bands as described herein, or the processor 1040 and the memory 1030 may be otherwise configured to perform or support such operations.

Figure 11:
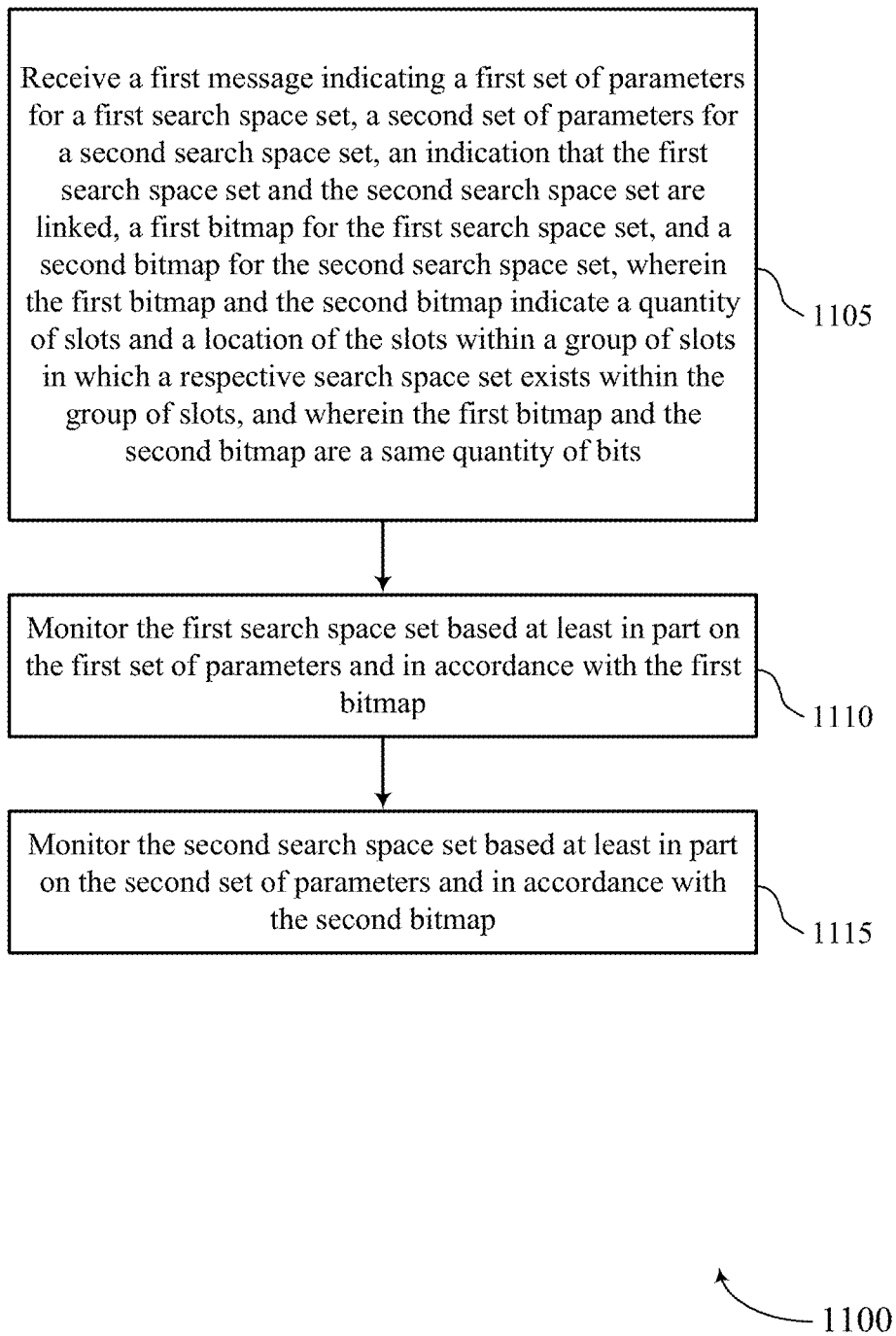
FIGS. 11 through 15 show flowcharts illustrating methods that support control channel repetition for higher bands in accordance with one or more aspects of the present disclosure.

FIG. 11 shows a flowchart illustrating a method 1100 that supports control channel repetition for higher bands in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1105, the method may include receiving a first message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits. The operations of 1105 may be performed in accordance with examples as disclosed herein. In some examples, aspects of the operations of 1105 may be performed by a message reception component 925 as described with reference to FIG. 9.

At 1110, the method may include monitoring the first search space set based at least in part on the first set of parameters and in accordance with the first bitmap. The operations of 1110 may be performed in accordance with examples as disclosed herein. In some examples, aspects of the operations of 1110 may be performed by a monitoring component 930 as described with reference to FIG. 9.

At 1115, the method may include monitoring the second search space set based at least in part on the second set of parameters and in accordance with the second bitmap. The operations of 1115 may be performed in accordance with examples as disclosed herein. In some examples, aspects of the operations of 1115 may be performed by a search space monitoring component 935 as described with reference to FIG. 9.

Figure 12:
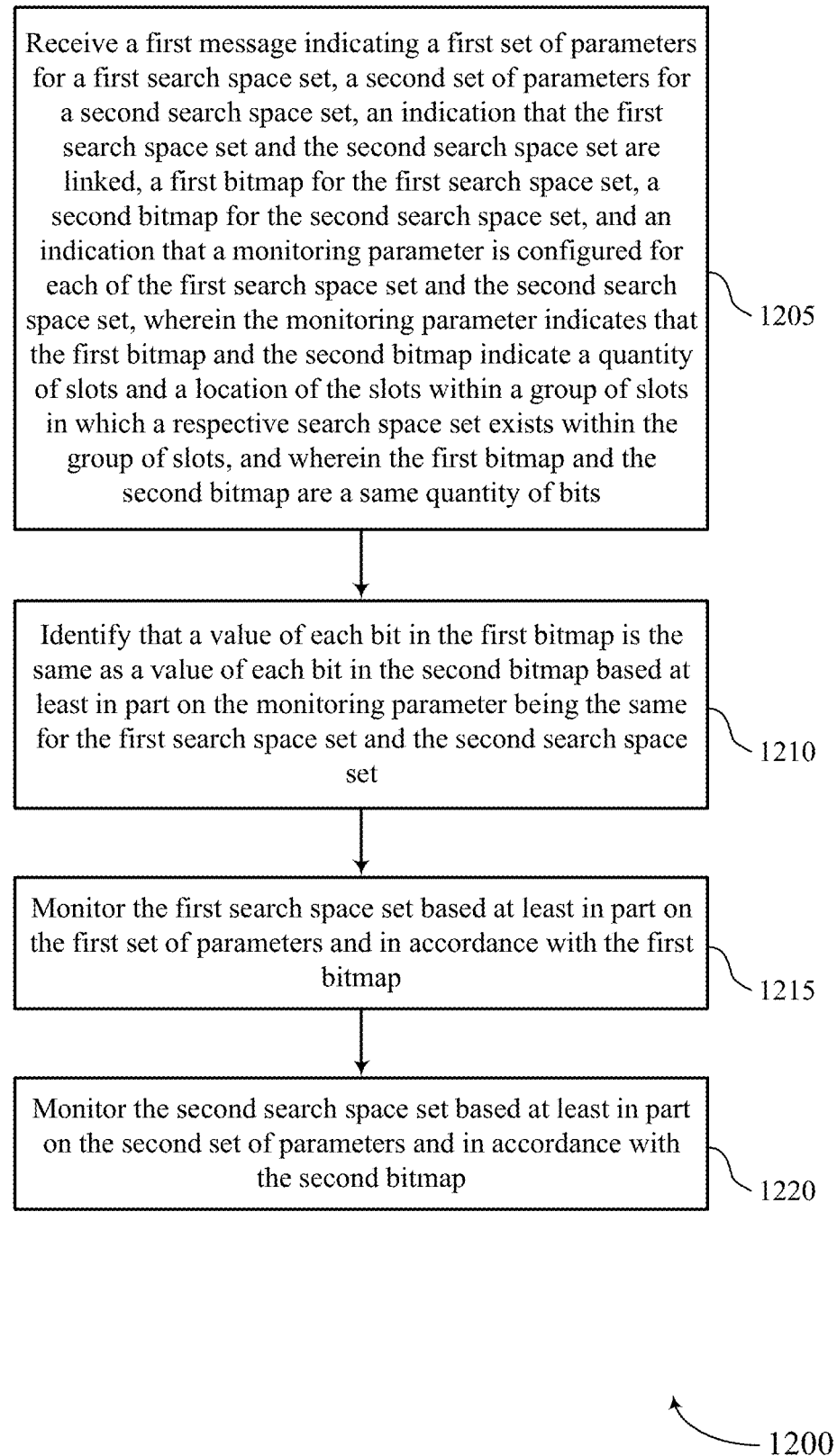

FIG. 12 shows a flowchart illustrating a method 1200 that supports control channel repetition for higher bands in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1205, the method may include receiving a first message indicating a first set of parameters for a first search space set, a second set of parameters for a second search space set, an indication that the first search space set and the second search space set are linked, a first bitmap for the first search space set, a second bitmap for the second search space set, and an indication that a monitoring parameter is configured for each of the first search space set and the second search space set, wherein the monitoring parameter indicates that the first bitmap and the second bitmap indicate a quantity of slots and a location of the slots within a group of slots in which a respective search space set exists within the group of slots, and wherein the first bitmap and the second bitmap are a same quantity of bits. The operations of 1205 may be performed in accordance with examples as disclosed herein. In some examples, aspects of the operations of 1205 may be performed by a message reception component 925 as described with reference to FIG. 9.

At 1210, the method may include identifying that a value of each bit in the first bitmap is the same as a value of each bit in the second bitmap based at least in part on the monitoring parameter being the same for the first search space set and the second search space set. The operations of 1210 may be performed in accordance with examples as disclosed herein. In some examples, aspects of the operations of 1210 may be performed by an intra-slot PDCCH repetition component 950 as described with reference to FIG. 9.

At 1215, the method may include monitoring the first search space set based at least in part on the first set of parameters and in accordance with the first bitmap. The operations of 1215 may be performed in accordance with examples as disclosed herein. In some examples, aspects of the operations of 1215 may be performed by a monitoring component 930 as described with reference to FIG. 9.

At 1220, the method may include monitoring the second search space set based at least in part on the second set of parameters and in accordance with the second bitmap. The operations of 1220 may be performed in accordance with examples as disclosed herein. In some examples, aspects of the operations of 1220 may be performed by a search space monitoring component 935 as described with reference to FIG. 9.

Figure 13:
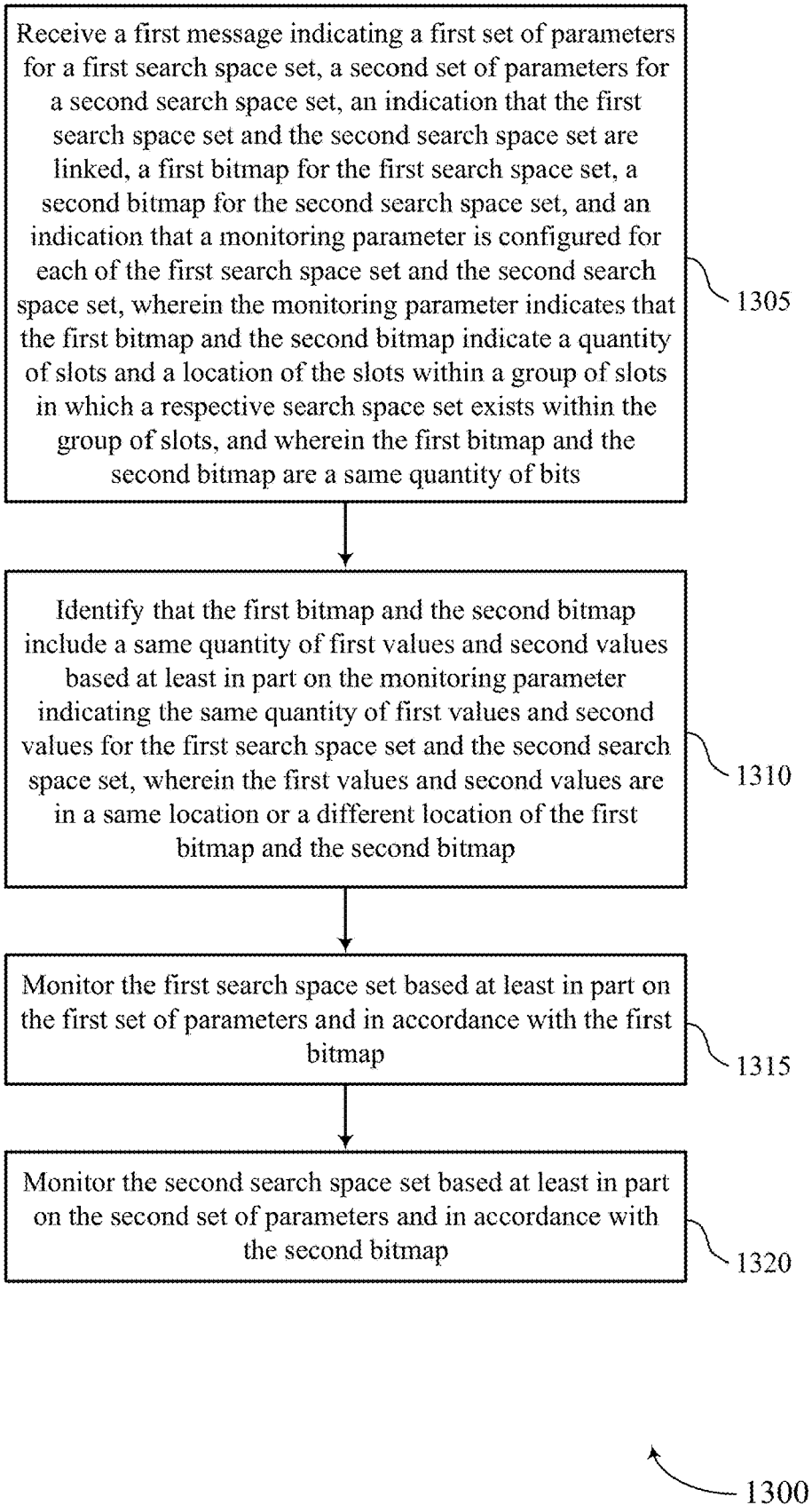

FIG. 13 shows a flowchart illustrating a method 1300 that supports control channel repetition for higher bands in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1305, the method may include receiving a first message indicating a first set of parameters for a first search space set, a second set of parameters for a second search space set, an indication that the first search space set and the second search space set are linked, a first bitmap for the first search space set, a second bitmap for the second search space set, and an indication that a monitoring parameter is configured for each of the first search space set and the second search space set, wherein the monitoring parameter indicates that the first bitmap and the second bitmap indicate a quantity of slots and a location of the slots within a group of slots in which a respective search space set exists within the group of slots, and wherein the first bitmap and the second bitmap are a same quantity of bits. The operations of 1305 may be performed in accordance with examples as disclosed herein. In some examples, aspects of the operations of 1305 may be performed by a message reception component 925 as described with reference to FIG. 9.

At 1310, the method may include identifying that the first bitmap and the second bitmap include a same quantity of first values and second values based at least in part on the monitoring parameter indicating the same quantity of first values and second values for the first search space set and the second search space set, wherein the first values and second values are in a same location or a different location of the first bitmap and the second bitmap. The operations of 1310 may be performed in accordance with examples as disclosed herein. In some examples, aspects of the operations of 1310 may be performed by an intra-slot-group PDCCH repetition component 955 as described with reference to FIG. 9.

At 1315, the method may include monitoring the first search space set based at least in part on the first set of parameters and in accordance with the first bitmap. The operations of 1315 may be performed in accordance with examples as disclosed herein. In some examples, aspects of the operations of 1315 may be performed by a monitoring component 930 as described with reference to FIG. 9.

At 1320, the method may include monitoring the second search space set based at least in part on the second set of parameters and in accordance with the second bitmap. The operations of 1320 may be performed in accordance with examples as disclosed herein. In some examples, aspects of the operations of 1320 may be performed by a search space monitoring component 935 as described with reference to FIG. 9.

Figure 14:
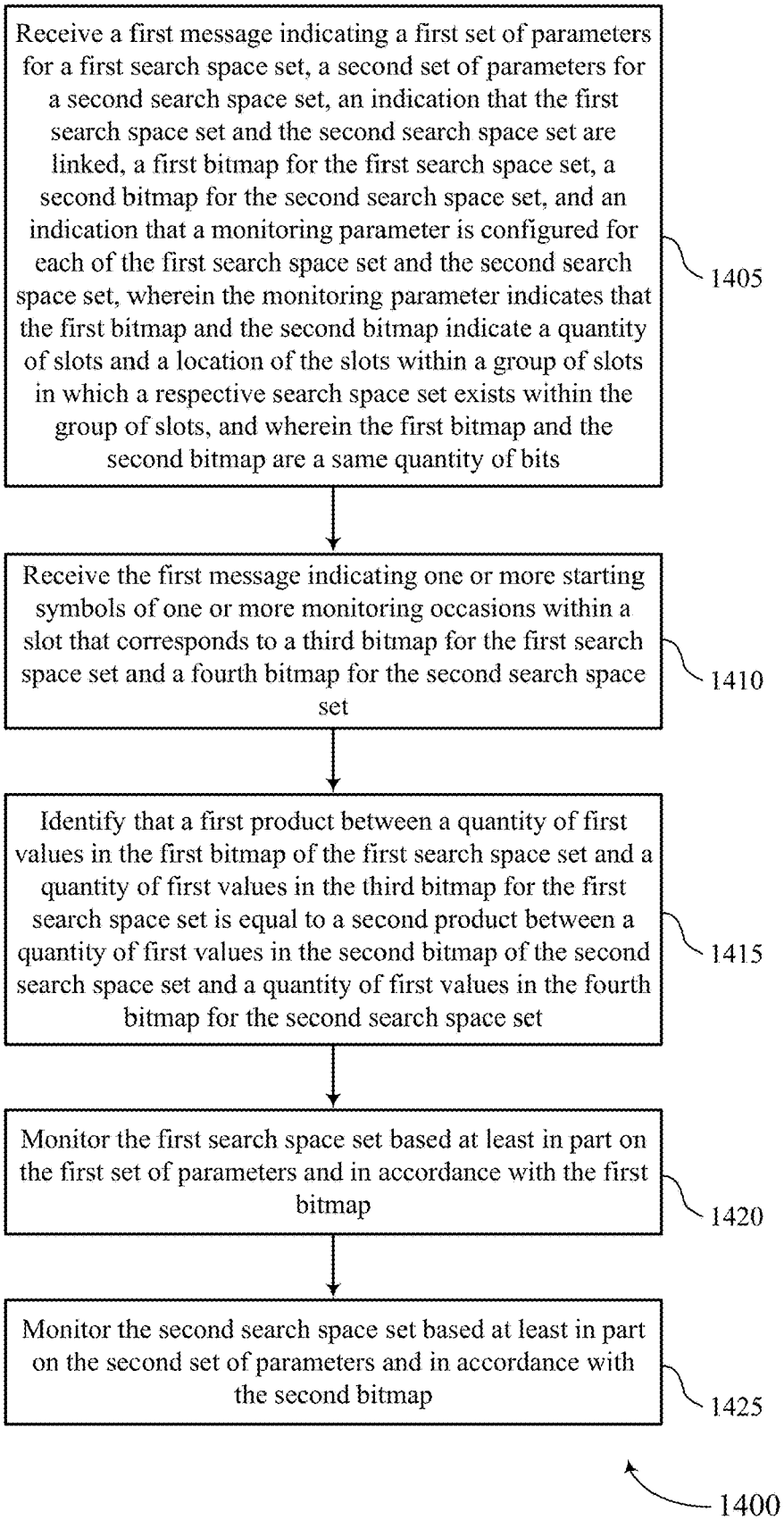

FIG. 14 shows a flowchart illustrating a method 1400 that supports control channel repetition for higher bands in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1405, the method may include receiving a first message indicating a first set of parameters for a first search space set, a second set of parameters for a second search space set, an indication that the first search space set and the second search space set are linked, a first bitmap for the first search space set, a second bitmap for the second search space set, and an indication that a monitoring parameter is configured for each of the first search space set and the second search space set, wherein the monitoring parameter indicates that the first bitmap and the second bitmap indicate a quantity of slots and a location of the slots within a group of slots in which a respective search space set exists within the group of slots, and wherein the first bitmap and the second bitmap are a same quantity of bits. The operations of 1405 may be performed in accordance with examples as disclosed herein. In some examples, aspects of the operations of 1405 may be performed by a message reception component 925 as described with reference to FIG. 9.

At 1410, the method may include receiving the first message indicating one or more starting symbols of one or more monitoring occasions within a slot that corresponds to a third bitmap for the first search space set and a fourth bitmap for the second search space set. The operations of 1410 may be performed in accordance with examples as disclosed herein. In some examples, aspects of the operations of 1410 may be performed by a bitmap product component 965 as described with reference to FIG. 9.

At 1415, the method may include identifying that a first product between a quantity of first values in the first bitmap of the first search space set and a quantity of first values in the third bitmap for the first search space set is equal to a second product between a quantity of first values in the second bitmap of the second search space set and a quantity of first values in the fourth bitmap for the second search space set. The operations of 1415 may be performed in accordance with examples as disclosed herein. In some examples, aspects of the operations of 1415 may be performed by a bitmap product component 965 as described with reference to FIG. 9.

At 1420, the method may include monitoring the first search space set based at least in part on the first set of parameters and in accordance with the first bitmap. The operations of 1420 may be performed in accordance with examples as disclosed herein. In some examples, aspects of the operations of 1420 may be performed by a monitoring component 930 as described with reference to FIG. 9.

At 1425, the method may include monitoring the second search space set based at least in part on the second set of parameters and in accordance with the second bitmap. The operations of 1425 may be performed in accordance with examples as disclosed herein. In some examples, aspects of the operations of 1425 may be performed by a search space monitoring component 935 as described with reference to FIG. 9.

Figure 15:
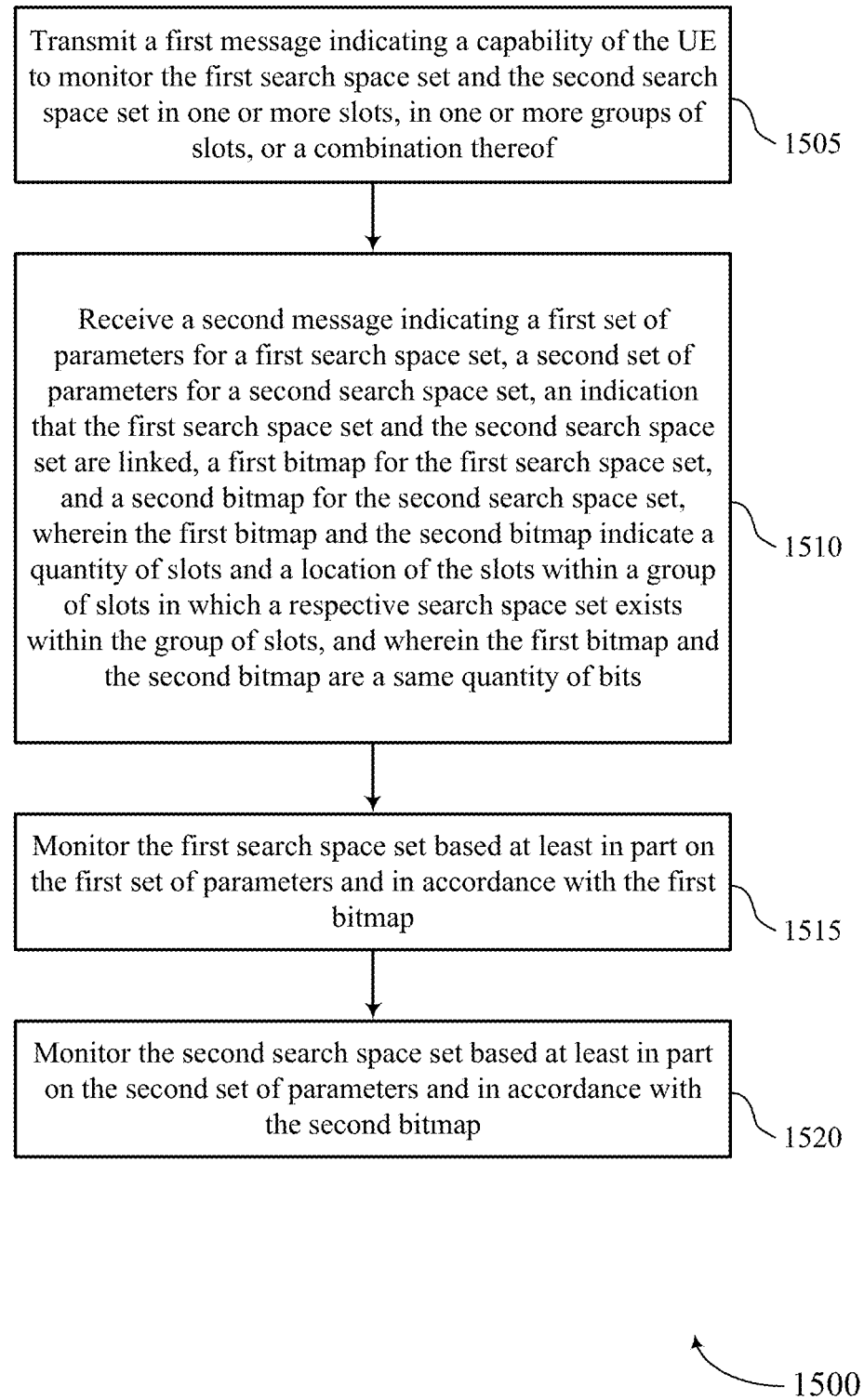

FIG. 15 shows a flowchart illustrating a method 1500 that supports control channel repetition for higher bands in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally, or alternatively, the UE may perform aspects of the described functions using special-purpose hardware.

At 1505, the method may include transmitting a first message indicating a capability of the UE to monitor the first search space set and the second search space set in one or more slots, in one or more groups of slots, or a combination thereof. The operations of 1505 may be performed in accordance with examples as disclosed herein. In some examples, aspects of the operations of 1505 may be performed by a UE capability component 960 as described with reference to FIG. 9.

At 1510, the method may include receiving a second message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits. The operations of 1510 may be performed in accordance with examples as disclosed herein. In some examples, aspects of the operations of 1510 may be performed by a message reception component 925 as described with reference to FIG. 9.

At 1515, the method may include monitoring the first search space set based at least in part on the first set of parameters and in accordance with the first bitmap. The operations of 1515 may be performed in accordance with examples as disclosed herein. In some examples, aspects of the operations of 1515 may be performed by a monitoring component 930 as described with reference to FIG. 9.

At 1520, the method may include monitoring the second search space set based at least in part on the second set of parameters and in accordance with the second bitmap. The operations of 1520 may be performed in accordance with examples as disclosed herein. In some examples, aspects of the operations of 1520 may be performed by a search space monitoring component 935 as described with reference to FIG. 9.

The following provides an overview of aspects of the present disclosure:

Aspect 1: A method for wireless communication at a UE, comprising: receiving a first message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits; monitoring the first search space set based at least in part on the first set of parameters and in accordance with the first bitmap; and monitoring the second search space set based at least in part on the second set of parameters and in accordance with the second bitmap.

Aspect 2: The method of aspect 1, wherein receiving the first message comprises: receiving the first message indicating that a linking parameter is configured with a first value corresponding to the first search space set and a second value corresponding to the second search space set, wherein the indication that the first search space set and the second search space set are linked is based at least in part on the linking parameter.

Aspect 3: The method of any of aspects 1 through 2, wherein receiving the first message comprises: receiving the first message indicating that a monitoring parameter is configured for each of the first search space set and the second search space set, wherein the indication of the quantity of slots and the location of the slots within the group of slots is based at least in part on the monitoring parameter.

Aspect 4: The method of aspect 3, further comprising: identifying that a value of each bit in the first bitmap is the same as a value of each bit in the second bitmap based at least in part on the monitoring parameter being the same for the first search space set and the second search space set.

Aspect 5: The method of aspect 4, further comprising: linking each monitoring occasion of a plurality of monitoring occasions of the first search space set with each monitoring occasion of a plurality of monitoring occasions of the second search space set in a first slot in which the first search space set and the second search space set are monitored.

Aspect 6: The method of any of aspects 3 through 5, further comprising: identifying that the first bitmap and the second bitmap include a same quantity of first values and second values based at least in part on the monitoring parameter indicating the same quantity of first values and second values for the first search space set and the second search space set, wherein the first values and second values are in a same location or a different location of the first bitmap and the second bitmap.

Aspect 7: The method of aspect 6, further comprising: monitoring the first search space set and the second search space set in the same quantity of slots based at least in part on identifying that the first bitmap and the second bitmap include a same quantity of first values and second values.

Aspect 8: The method of any of aspects 6 through 7, further comprising: linking a first instance within a first group of slots of the first search space set with a first instance within a second group of slots of the second search space set, wherein the first instance within the first group of slots corresponds to a first instance of a first value in the first bitmap and the first instance within the second group of slots corresponds to a first instance of the first value in the second bitmap.

Aspect 9: The method of aspect 8, further comprising: linking a first instance of a monitoring occasion of the first instance within the first group of slots of the first search space set with a first instance of a monitoring occasion of the first instance within the second group of slots of the second search space set.

Aspect 10: The method of any of aspects 6 through 9, further comprising: linking each monitoring occasion of a plurality of monitoring occasions of the first search space set with each monitoring occasion of a plurality of monitoring occasions of the second search space set in a first group of slots in which the first search space set and the second search space set are monitored.

Aspect 11: The method of any of aspects 3 through 10, wherein receiving the first message comprises: receiving the first message indicating one or more starting symbols of one or more monitoring occasions within a slot that corresponds to a third bitmap for the first search space set and a fourth bitmap for the second search space set; and identifying that a first product between a quantity of first values in the first bitmap of the first search space set and a quantity of first values in the third bitmap for the first search space set is equal to a second product between a quantity of first values in the second bitmap of the second search space set and a quantity of first values in the fourth bitmap for the second search space set.

Aspect 12: The method of aspect 11, further comprising: linking a first instance of a monitoring occasion within a first group of slots of the first search space set with a first instance of a monitoring occasion within a second group of slots of the second search space set.

Aspect 13: The method of any of aspects 11 through 12, wherein a periodicity, a slot offset, and a duration are the same for the first search space set and the second search space set based at least in part on a first product between a quantity of first values in the first bitmap of the first search space set and a quantity of first values in the third bitmap for the first search space set being equal to a second product between a quantity of first values in the second bitmap of the second search space set and a quantity of first values in the fourth bitmap for the second search space set.

Aspect 14: The method of any of aspects 3 through 13, wherein receiving the first message comprises: receiving the first message indicating one or more starting symbols of one or more monitoring occasions within a slot that corresponds to a third bitmap for each of the first search space set and the second search space set; and identifying that a first product between a quantity of first values in the first bitmap of the first search space set and a quantity of first values in the third bitmap for the first search space set is equal to a second product between a quantity of first values in the second bitmap of the second search space set and a quantity of first values in the third bitmap for the second search space set.

Aspect 15: The method of any of aspects 1 through 14, wherein a periodicity, a slot offset, a duration, and a quantity of monitoring occasions within a slot are the same for the first search space set and the second search space set based at least in part on the first bitmap and the second bitmap being the same.

Aspect 16: The method of any of aspects 1 through 15, wherein a periodicity, a slot offset, a duration, and a quantity of monitoring occasions within a slot are the same for the first search space set and the second search space set based at least in part on the first bitmap and the second bitmap having a same quantity of first values and second values.

Aspect 17: The method of any of aspects 1 through 16, further comprising: transmitting a second message indicating a capability of the UE to monitor the first search space set and the second search space set in one or more slots, in one or more groups of slots, or a combination thereof.

Aspect 18: The method of aspect 17, wherein transmitting the second message comprises: transmitting the second message indicating the capability of the UE to link the first search space set and the second search space set each with more than one monitoring slots within a group of slots.

Aspect 19: The method of any of aspects 17 through 18, wherein transmitting the second message comprises: transmitting the second message indicating the capability of the UE to configure the first search space set linked to the second search space set with different monitoring slots within a group of slots with more than one monitoring occasions within a slot.

Aspect 20: The method of any of aspects 1 through 19, further comprising: monitoring a first control channel candidate in the first search space set and a second control channel candidate in the second search space set to detect a same downlink control information payload.

Aspect 21: An apparatus for wireless communication at a UE, comprising a processor; and a memory coupled with the processor; wherein the memory comprises instructions executable by the processor to cause the apparatus to perform a method of any of aspects 1 through 20.

Aspect 22: An apparatus for wireless communication at a UE, comprising at least one means for performing a method of any of aspects 1 through 20.

Aspect 23: A non-transitory computer-readable medium storing code for wireless communication at a UE, the code comprising instructions executable by a processor to perform a method of any of aspects 1 through 20.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   a processor; and
   a memory coupled with the processor, wherein the memory comprises instructions executable by the processor to cause the apparatus to:
   receive a first message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits;
   monitor the first search space set based at least in part on the first set of parameters and in accordance with the first bitmap; and
   monitor the second search space set based at least in part on the second set of parameters and in accordance with the second bitmap.

2. The apparatus of claim 1, wherein the instructions to receive the first message are executable by the processor to cause the apparatus to:
   receive the first message indicating that a linking parameter is configured with a first value corresponding to the first search space set and a second value corresponding to the second search space set, wherein the indication that the first search space set and the second search space set are linked is based at least in part on the linking parameter.

3. The apparatus of claim 1, wherein the instructions to receive the first message are executable by the processor to cause the apparatus to:
   receive the first message indicating that a monitoring parameter is configured for each of the first search space set and the second search space set, wherein the indication of the quantity of slots and the location of the slots within the group of slots is based at least in part on the monitoring parameter.

4. The apparatus of claim 3, wherein the instructions are further executable by the processor to cause the apparatus to:
   identify that a value of each bit in the first bitmap is the same as a value of each bit in the second bitmap based at least in part on the monitoring parameter being the same for the first search space set and the second search space set.

5. The apparatus of claim 4, wherein the instructions are further executable by the processor to cause the apparatus to:
link each monitoring occasion of a plurality of monitoring occasions of the first search space set with each monitoring occasion of a plurality of monitoring occasions of the second search space set in a first slot in which the first search space set and the second search space set are monitored.

6. The apparatus of claim 3, wherein the instructions are further executable by the processor to cause the apparatus to:
identify that the first bitmap and the second bitmap include a same quantity of first values and second values based at least in part on the monitoring parameter indicating the same quantity of first values and second values for the first search space set and the second search space set, wherein the first values and second values are in a same location or a different location of the first bitmap and the second bitmap.

7. The apparatus of claim 6, wherein the instructions are further executable by the processor to cause the apparatus to:
monitor the first search space set and the second search space set in the same quantity of slots based at least in part on identifying that the first bitmap and the second bitmap include a same quantity of first values and second values.

8. The apparatus of claim 6, wherein the instructions are further executable by the processor to cause the apparatus to:
link a first instance within a first group of slots of the first search space set with a first instance within a second group of slots of the second search space set, wherein the first instance within the first group of slots corresponds to a first instance of a first value in the first bitmap and the first instance within the second group of slots corresponds to a first instance of the first value in the second bitmap.

9. The apparatus of claim 8, wherein the instructions are further executable by the processor to cause the apparatus to:
link a first instance of a monitoring occasion of the first instance within the first group of slots of the first search space set with a first instance of a monitoring occasion of the first instance within the second group of slots of the second search space set.

10. The apparatus of claim 6, wherein the instructions are further executable by the processor to cause the apparatus to:
link each monitoring occasion of a plurality of monitoring occasions of the first search space set with each monitoring occasion of a plurality of monitoring occasions of the second search space set in a first group of slots in which the first search space set and the second search space set are monitored.

11. The apparatus of claim 3, wherein the instructions to receive the first message are executable by the processor to cause the apparatus to:
receive the first message indicating one or more starting symbols of one or more monitoring occasions within a slot that corresponds to a third bitmap for the first search space set and a fourth bitmap for the second search space set; and
identify that a first product between a quantity of first values in the first bitmap of the first search space set and a quantity of first values in the third bitmap for the first search space set is equal to a second product between a quantity of first values in the second bitmap of the second search space set and a quantity of first values in the fourth bitmap for the second search space set.

12. The apparatus of claim 11, wherein the instructions are further executable by the processor to cause the apparatus to:
link a first instance of a monitoring occasion within a first group of slots of the first search space set with a first instance of a monitoring occasion within a second group of slots of the second search space set.

13. The apparatus of claim 11, wherein a periodicity, a slot offset, and a duration are the same for the first search space set and the second search space set based at least in part on a first product between a quantity of first values in the first bitmap of the first search space set and a quantity of first values in the third bitmap for the first search space set being equal to a second product between a quantity of first values in the second bitmap of the second search space set and a quantity of first values in a fourth bitmap for the second search space set.

14. The apparatus of claim 3, wherein the instructions to receive the first message are executable by the processor to cause the apparatus to:
receive the first message indicating one or more starting symbols of one or more monitoring occasions within a slot that corresponds to a third bitmap for each of the first search space set and the second search space set; and
identify that a first product between a quantity of first values in the first bitmap of the first search space set and a quantity of first values in the third bitmap for the first search space set is equal to a second product between a quantity of first values in the second bitmap of the second search space set and a quantity of first values in the third bitmap for the second search space set.

15. The apparatus of claim 1, wherein a periodicity, a slot offset, a duration, and a quantity of monitoring occasions within a slot are the same for the first search space set and the second search space set based at least in part on the first bitmap and the second bitmap being the same.

16. The apparatus of claim 1, wherein a periodicity, a slot offset, a duration, and a quantity of monitoring occasions within a slot are the same for the first search space set and the second search space set based at least in part on the first bitmap and the second bitmap having a same quantity of first values and second values.

17. The apparatus of claim 1, wherein the instructions are further executable by the processor to cause the apparatus to:
transmit a second message indicating a capability of the UE to monitor the first search space set and the second search space set in one or more slots, in one or more groups of slots, or a combination thereof.

18. The apparatus of claim 17, wherein the instructions to transmit the second message are executable by the processor to cause the apparatus to:
transmit the second message indicating the capability of the UE to link the first search space set and the second search space set each with more than one monitoring slots within a group of slots.

19. The apparatus of claim 17, wherein the instructions to transmit the second message are executable by the processor to cause the apparatus to:
transmit the second message indicating the capability of the UE to configure the first search space set linked to the second search space set with different monitoring slots within a group of slots with more than one monitoring occasions within a slot.

20. The apparatus of claim 1, wherein the instructions are further executable by the processor to cause the apparatus to:

monitor a first control channel candidate in the first search space set and a second control channel candidate in the second search space set to detect a same downlink control information payload.

21. A method for wireless communication at a user equipment (UE), comprising:
receiving a first message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits;
monitoring the first search space set based at least in part on the first set of parameters and in accordance with the first bitmap; and
monitoring the second search space set based at least in part on the second set of parameters and in accordance with the second bitmap.

22. The method of claim 21, wherein receiving the first message comprises:
receiving the first message indicating that a linking parameter is configured with a first value corresponding to the first search space set and a second value corresponding to the second search space set, wherein the indication that the first search space set and the second search space set are linked is based at least in part on the linking parameter.

23. The method of claim 21, wherein receiving the first message comprises:
receiving the first message indicating that a monitoring parameter is configured for each of the first search space set and the second search space set, wherein the indication of the quantity of slots and the location of the slots within the group of slots is based at least in part on the monitoring parameter.

24. The method of claim 23, further comprising:
identifying that a value of each bit in the first bitmap is the same as a value of each bit in the second bitmap based at least in part on the monitoring parameter being the same for the first search space set and the second search space set.

25. The method of claim 24, further comprising:
linking each monitoring occasion of a plurality of monitoring occasions of the first search space set with each monitoring occasion of a plurality of monitoring occasions of the second search space set in a first slot in which the first search space set and the second search space set are monitored.

26. The method of claim 23, further comprising:
identifying that the first bitmap and the second bitmap include a same quantity of first values and second values based at least in part on the monitoring parameter indicating the same quantity of first values and second values for the first search space set and the second search space set, wherein the first values and second values are in a same location or a different location of the first bitmap and the second bitmap.

27. The method of claim 26, further comprising:
monitoring the first search space set and the second search space set in the same quantity of slots based at least in part on identifying that the first bitmap and the second bitmap include a same quantity of first values and second values.

28. The method of claim 26, further comprising:
linking a first instance within a first group of slots of the first search space set with a first instance within a second group of slots of the second search space set, wherein the first instance within the first group of slots corresponds to a first instance of a first value in the first bitmap and the first instance within the second group of slots corresponds to a first instance of the first value in the second bitmap.

29. An apparatus for wireless communication at a user equipment (UE), comprising:
means for receiving a first message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits;
means for monitoring the first search space set based at least in part on the first set of parameters and in accordance with the first bitmap; and
means for monitoring the second search space set based at least in part on the second set of parameters and in accordance with the second bitmap.

30. A non-transitory computer-readable medium storing code for wireless communication at a user equipment (UE), the code comprising instructions executable by a processor to:
receive a first message indicating a first set of parameters for a first search space set, a second set of parameters for a second search space set, an indication that the first search space set and the second search space set are linked, a first bitmap for the first search space set, and a second bitmap for the second search space set, wherein the first bitmap and the second bitmap indicate a quantity of slots and a location of the slots within a group of slots in which a respective search space set exists within the group of slots, and wherein the first bitmap and the second bitmap are a same quantity of bits;
monitor the first search space set based at least in part on the first set of parameters and in accordance with the first bitmap; and
monitor the second search space set based at least in part on the second set of parameters and in accordance with the second bitmap.

* * * * *